United States Patent
Kim

(10) Patent No.: US 10,816,657 B2
(45) Date of Patent: Oct. 27, 2020

(54) MOTION DETECTING APPARATUS, MOTION DETECTING METHOD AND MOTION DETECTING ANTENNA

(71) Applicant: HYUNDAI MOTOR COMPANY, Seoul (KR)

(72) Inventor: Dongjin Kim, Seoul (KR)

(73) Assignee: Hyundai Motor Company, Seoul (KR)

( * ) Notice: Subject to any disclaimer, the term of this patent is extended or adjusted under 35 U.S.C. 154(b) by 264 days.

(21) Appl. No.: 15/381,728

(22) Filed: Dec. 16, 2016

(65) Prior Publication Data

US 2018/0062769 A1  Mar. 1, 2018

(30) Foreign Application Priority Data

Sep. 1, 2016  (KR) .................. 10-2016-0112696

(51) Int. Cl.
| | |
|---|---|
| *G01S 13/62* | (2006.01) |
| *H01Q 13/12* | (2006.01) |
| *H01Q 5/30* | (2015.01) |
| *H01Q 1/32* | (2006.01) |
| *H01Q 13/10* | (2006.01) |
| *G01S 13/50* | (2006.01) |
| *H01Q 21/30* | (2006.01) |
| *G06F 3/01* | (2006.01) |
| *H01Q 5/357* | (2015.01) |

(52) U.S. Cl.
CPC .............. *G01S 13/62* (2013.01); *G01S 13/50* (2013.01); *H01Q 1/3291* (2013.01); *H01Q 5/30* (2015.01); *H01Q 13/10* (2013.01); *H01Q 13/12* (2013.01); *H01Q 21/30* (2013.01); *G06F 3/017* (2013.01); *H01Q 5/357* (2015.01)

(58) Field of Classification Search
CPC .. G01S 13/50–56; H01Q 21/30; H01Q 13/12; H01Q 13/10; H01Q 1/3291; H01Q 5/30; H01Q 5/357; H04B 17/102; G06F 3/017
See application file for complete search history.

(56) References Cited

U.S. PATENT DOCUMENTS

| | | | | |
|---|---|---|---|---|
| 3,524,189 | A * | 8/1970 | Jones, Jr. ............... | H01Q 1/281 343/705 |
| 8,483,617 | B2 * | 7/2013 | Rofougaran .......... | G06F 1/1626 455/575.7 |
| 9,972,901 | B2 * | 5/2018 | Lavin ..................... | H01Q 1/428 |
| 2013/0154899 | A1 * | 6/2013 | Lewis, III ............. | H01Q 21/22 343/893 |

(Continued)

FOREIGN PATENT DOCUMENTS

| | | | | |
|---|---|---|---|---|
| FR | 2997046 A1 * | 4/2014 | ............. | B60K 35/00 |
| JP | 11-43009 | 2/1999 | | |

(Continued)

*Primary Examiner* — Matthew M Barker
(74) *Attorney, Agent, or Firm* — Morgan, Lewis & Bockius LLP

(57) ABSTRACT

A motion detecting apparatus includes a motion detecting antenna for radiating a plurality of radio waves having different frequencies, a motion detector for providing a plurality of detection signals having different frequencies to the motion detecting antenna and receiving reflection signals from the motion detecting antenna, and a controller for determining a motion of a driver based on the reflection signals received by the motion detector.

11 Claims, 22 Drawing Sheets

(56) References Cited

U.S. PATENT DOCUMENTS

| | | | | |
|---|---|---|---|---|
| 2016/0259037 A1* | 9/2016 | Molchanov | ............ | G06F 3/011 |
| 2016/0311388 A1* | 10/2016 | Diewald | ................ | G01S 13/04 |
| 2016/0320852 A1* | 11/2016 | Poupyrev | ............ | G06F 3/0325 |
| 2017/0190336 A1* | 7/2017 | Vijayan | ................ | B60Q 1/525 |
| 2017/0336497 A1* | 11/2017 | Jungmaier | ............ | G01S 7/415 |
| 2018/0046255 A1* | 2/2018 | Rothera | ................ | G01S 7/412 |

FOREIGN PATENT DOCUMENTS

| | | | | |
|---|---|---|---|---|
| JP | 2000-258529 A | 9/2000 | | |
| JP | 2004-294338 | 10/2004 | | |
| KR | 10-0944550 B1 | 3/2010 | | |
| KR | 10-0959700 B1 | 5/2010 | | |
| KR | 10-2013-0039721 | 4/2013 | | |
| KR | 10-1469720 B1 | 12/2014 | | |
| WO | WO-2015086346 A1 * | 6/2015 | ............ | G01S 13/04 |

* cited by examiner

MOTION DETECTING APPARATUS, MOTION DETECTING METHOD AND MOTION DETECTING ANTENNA

CROSS-REFERENCE TO RELATED APPLICATION(S)

This application claims the benefit of priority to Korean Patent Application No. 10-2016-0112696, filed on Sep. 1, 2016 with the Korean Intellectual Property Office, the disclosure of which is incorporated herein by reference.

TECHNICAL FIELD

Embodiments of the present disclosure relate to motion detecting apparatuses, motion detecting methods, and motion detecting antennas, and more particularly, to motion detecting apparatuses configured to detect a motion of a driver, motion detecting methods, and motion detecting antennas.

BACKGROUND

In general, vehicles are transportation apparatuses that travel on roads or railroads by using a fossil fuels, electricity, and the like as a power source.

Recently, vehicles have been equipped with an audio apparatus and a video apparatus to allow drivers to enjoy music and videos while driving the vehicles, in addition to simply transporting goods and people. A navigation apparatus displaying a route to a destination has also been installed in the vehicles. Furthermore, vehicles have been equipped with an audio/video/navigation (AVN) apparatus in which the audio, video and navigation apparatuses are integrated.

However, the driver may be distracted while controlling the AVN apparatus and the risk of accidents may increase since a hand of the driver controls the AVN apparatus without holding a steering wheel. Thus, there is an unmet need for a system capable of detecting a motion of a driver to increase vehicle operability and safety.

SUMMARY

Therefore, it is an aspect of exemplary embodiments to provide a motion detecting apparatus and a motion detecting method to detect a motion of a driver and recognize a control command corresponding to the detected motion.

It is another aspect of exemplary embodiments to provide a motion detecting antenna configured to radiate radio waves having different frequencies in different directions.

It is another aspect of exemplary embodiments to provide a motion detecting antenna configured to radiate radio waves having different frequencies from different positions.

Additional aspects of exemplary embodiments will be set forth in part in the description which follows and, in part, will be obvious from the description, or may be learned by practice of the disclosure.

In accordance with some aspect of exemplary embodiments, a motion detecting apparatus may include a motion detecting antenna configured to radiate a plurality of radio waves having different frequencies, a motion detector configured to provide a plurality of detection signals having different frequencies to the motion detecting antenna and receive reflection signals from the motion detecting antenna, and a controller configured to determine a motion of a driver based on the reflection signals received by the motion detector.

The motion detecting antenna may radiate the plurality of radio waves having different frequencies from a plurality of different positions.

The motion detector may provide a first detection signal having a first frequency and a second detection signal having a second frequency to the motion detecting antenna.

The motion detecting antenna may radiate a first radio wave having a first frequency from a first position and a second radio wave having a second frequency from a second position.

The motion detecting antenna may output a first reflection signal to the motion detector when a body of the driver is located at the first position and outputs a second reflection signal to the motion detector when the body of the driver is located at the second position.

The controller may determine that the body of the driver is located at the first position upon receiving the first reflection signal from the motion detecting antenna and determines that the body of the driver is located at the second position upon receiving the second reflection signal from the motion detecting antenna.

The motion detecting antenna may radiate the plurality of radio waves having different frequencies in a plurality of different directions.

The motion detector may provide a first detection signal having a first frequency and a second detection signal having a second frequency to the motion detecting antenna.

The motion detecting antenna may radiate a first radio wave having the first frequency in a first direction and a second radio wave having the second frequency in a second direction.

The motion detecting antenna may output a first reflection signal to the motion detector when the body of the driver is located in the first direction and outputs a second reflection signal to the motion detector when the body of the driver is located in the second direction.

The controller may determine that the body of the driver is located in the first direction upon receiving the first reflection signal from the motion detecting antenna and determines that the body of the driver is located in the second direction upon receiving the second reflection signal from the motion detecting antenna.

In accordance with some aspects of exemplary embodiments, a method of detecting a motion may include providing a plurality of detection signals having different frequencies to a motion detecting antenna, radiating a plurality of radio waves having different frequencies via the motion detecting antenna, receiving reflection signals from the motion detecting antenna, and determining a motion of a driver based on the reflection signals.

The radiating of the plurality of radio waves having different frequencies via the motion detecting antenna may include radiating a plurality of radio waves having different frequencies respectively from a plurality of different positions via the motion detecting antenna.

When a body of a driver is located at one or more positions among the plurality of different positions, a reflection signal having the same frequency as a frequency of the radio wave radiated from the one or more positions may be received.

The radiating of the plurality of radio waves having different frequencies via the motion detecting antenna may include radiating a plurality of radio waves having different frequencies in a plurality of different directions via the motion detecting antenna.

When a body of a driver is located in one or more directions among the plurality of different directions, a reflection signal having the same frequency as a frequency of the radio wave radiated in the one or more directions may be received.

In accordance with some aspects of exemplary embodiments, a motion detecting antenna may include an antenna body comprising a pair of circular bottom surfaces facing each other and a side surface formed along circumferences of the bottom surfaces and having a radiation cavity in the antenna body, a feed pin extending into the radiation cavity through one of the bottom surfaces and configured to radiate radio waves in the radiation cavity, and a plurality of slots having different sizes and formed at different positions of the side surface along the circumferences of the bottom surfaces.

The plurality of slots may be formed to face different directions along the circumferences of the bottom surfaces.

The plurality of slots may include a first slot disposed at a first position and having a first size and a second slot disposed at a second position and having a second size.

The plurality of slots may include a first slot disposed at a first position and configured to radiate a first radio wave having a first frequency and a second slot disposed at a second position and configured to radiate a second radio wave having a second frequency.

BRIEF DESCRIPTION OF THE DRAWINGS

These and/or other aspects of the disclosure will become apparent and more readily appreciated from the following description of the exemplary embodiments, taken in conjunction with the accompanying drawings of which.

DETAILED DESCRIPTION

Figure 1:
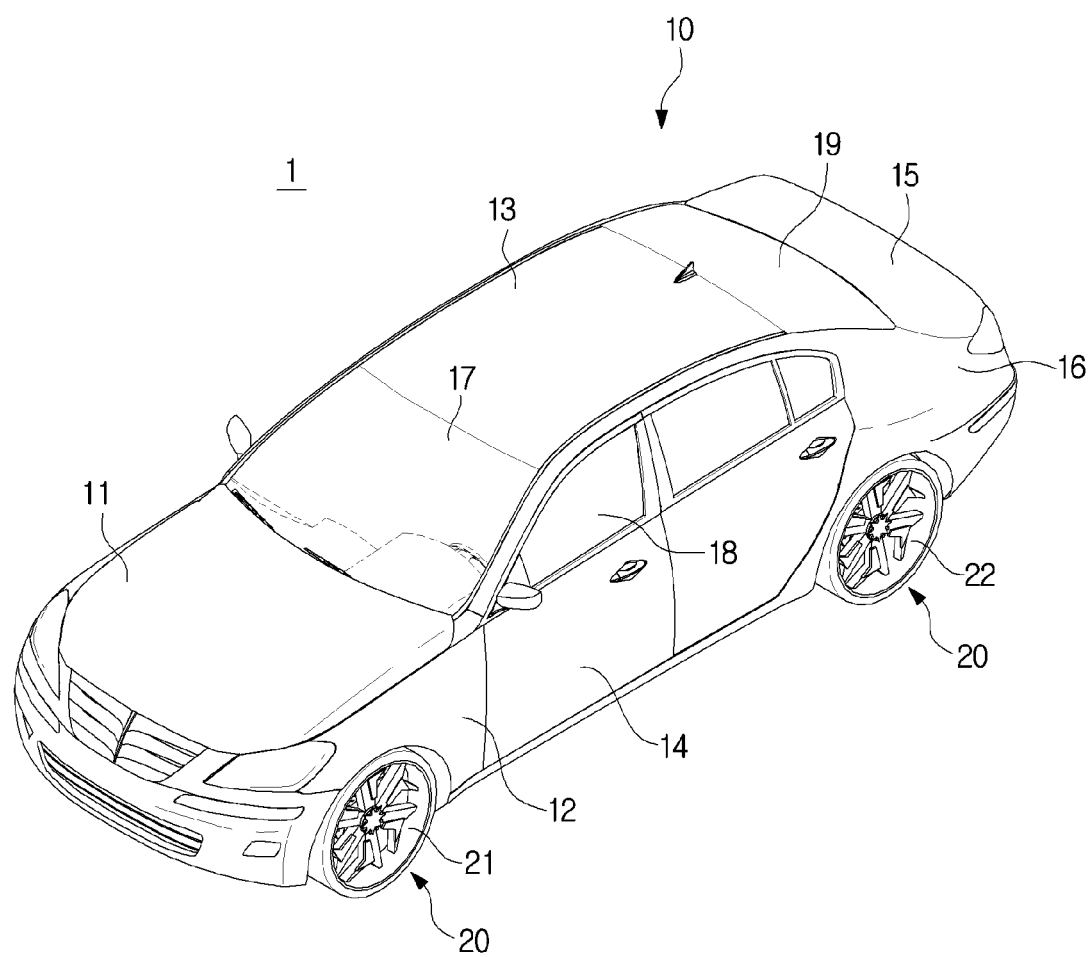
FIG. 1 is an exterior view of a vehicle according to exemplary embodiments of the present disclosure.

The following detailed description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. The progression of processing operations described is an example; however, the sequence of and/or operations is not limited to that set forth herein and may be changed as is known in the art, with the exception of operations necessarily occurring in a particular order. In addition, respective descriptions of well-known functions and constructions may be omitted for increased clarity and conciseness.

Additionally, exemplary embodiments will now be described more fully hereinafter with reference to the accompanying drawings. The exemplary embodiments may, however, be embodied in many different forms and should not be construed as being limited to the embodiments set forth herein. These embodiments are provided so that this disclosure will be thorough and complete and will fully convey the exemplary embodiments to those of ordinary skill in the art. Like numerals denote like elements throughout.

It will be understood that, although the terms first, second, etc. may be used herein to describe various elements, these elements should not be limited by these terms. These terms are only used to distinguish one element from another. As used herein, the term "and/or," includes any and all combinations of one or more of the associated listed items.

It will be understood that when an element is referred to as being "connected," or "coupled," to another element, it can be directly connected or coupled to the other element or intervening elements may be present. In contrast, when an element is referred to as being "directly connected," or "directly coupled," to another element, there are no intervening elements present.

The terminology used herein is for the purpose of describing particular embodiments only and is not intended to be limiting. As used herein, the singular forms "a," "an" and "the" are intended to include the plural forms as well, unless the context clearly indicates otherwise.

Reference will now be made in detail to the exemplary embodiments of the present disclosure, examples of which are illustrated in the accompanying drawings, wherein like reference numerals refer to like elements throughout.

The present disclosure may, however, be embodied in many different forms and should not be construed as being limited to the embodiments set forth herein; rather, these embodiments are provided so that this disclosure will be thorough and complete, and will fully convey the concept of the disclosure to those of ordinary skill in the art.

Figure 2:
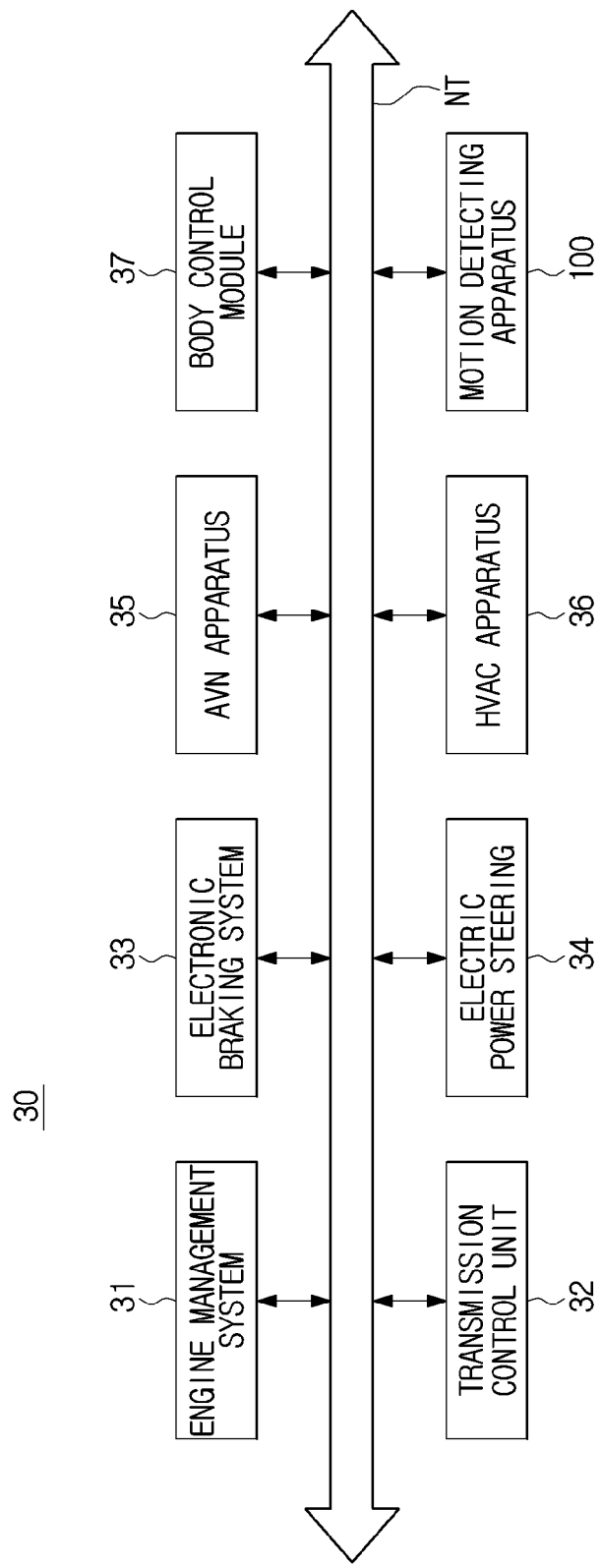
FIG. 2 is a view illustrating electrical components of a vehicle according to exemplary embodiments of the present disclosure.
Figure 3:
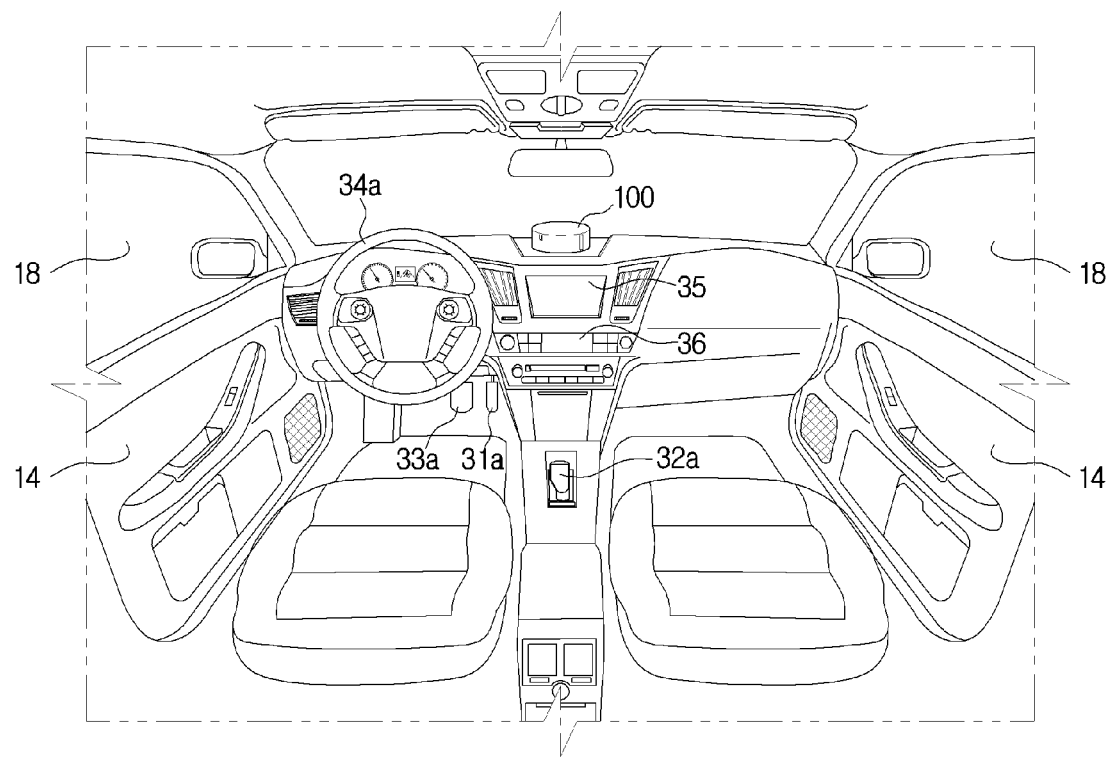
FIG. 3 is an interior view of a vehicle according to exemplary embodiments of the present disclosure.

FIG. 1 is an exterior view of a vehicle according to exemplary embodiments of the present disclosure. FIG. 2 is a view illustrating electrical parts of a vehicle according to exemplary embodiments of the present disclosure. FIG. 3 is an interior view of a vehicle according to exemplary embodiments of the present disclosure.

As illustrated in FIG. 1, a vehicle 1 includes a body 10 defining an appearance of the vehicle 1 and accommodating various parts and wheels 20 configured to move the vehicle 1.

The body 10 may include a hood 11, front fenders 12, a roof panel 13, doors 14, a trunk lid 15, quarter panels 16 and the like to form an indoor space where a driver stays. Also, a front window 17 is provided at a front portion of the body 10 and side widows 18 may be installed at sides of the body 10 to provide the driver with views. In addition, a rear window 19 may be installed at a rear portion of the body 10.

The body 10 may include a power generation apparatus, a power transmission apparatus, a steering apparatus, a brake apparatus, and the like to drive the vehicle 1. The power generation apparatus generates a rotational force for the wheels 20 and may include an engine, a fuel supply apparatus, a cooling apparatus, an exhaust apparatus, an ignition apparatus, and the like. The power transmission apparatus transmits the rotational force generated by the power generation apparatus to the wheels 20 and may include a clutch, a transmission lever, a transmission, a differential apparatus, a driving shaft, and the like. The steering apparatus controls a driving direction of the vehicle 1 and may include a steering wheel, a steering gear, a steering link, and the like. The brake apparatus stops rotation of the wheels 20 and may include a brake pedal, a master cylinder, a brake disc, a brake pad, and the like.

The wheels 20 include front wheels 21 disposed at front portions of the vehicle 1, and rear wheels 22 disposed at rear portions of the vehicle 1. The vehicle 1 may move forward or backward by rotation of the wheels 20.

The vehicle 1 may further include various electrical parts 30 for the control of the vehicle 1 and the safety and convenience of the driver and passengers in addition to the aforementioned mechanical apparatuses.

For example, as illustrated in FIGS. 2 and 3, the vehicle 1 may include an engine management system (EMS) 31, a transmission control unit (TCU) 32, an electronic braking system (EBS) 33, an electric power steering (EPS) 34, an audio/video/navigation (AVN) apparatus 35, a heating/ventilation/air conditioning (HVAC) apparatus 36, a body control module (BCM) 37 and a motion detecting apparatus 100.

The engine management system 31 may control operations of an engine (not shown) and manage the engine in accordance with an acceleration command of the driver via an acceleration pedal 31a. For example, the engine management system 31 may perform engine torque control, fuel consumption rate control, engine malfunction diagnosis and the like.

The transmission control unit 32 may control operations of a transmission (not shown) in accordance with a driver's command to shift gears via a transmission lever 32a or a speed of the vehicle 1. For example, the transmission control unit 32 may perform gear shifting control, damper clutch control, pressure control during on/off operation of a friction clutch, engine torque control while shifting gears, and the like.

The electronic braking system 33 may control a brake apparatus of the vehicle 1 in accordance with a command to stop the vehicle via a brake pedal 33a and maintain balance, or stability, of the vehicle 1. For example, the electronic braking system 33 may include an anti-lock brake system (ABS), an electric stability control (ESC) and the like.

The electric power steering 34 may help the driver to easily control a steering wheel 34a. For example, the electric power steering 34 may assist steering manipulation of a user by reducing a required steering input force during low-speed driving or parking and increasing the required steering force during a high-speed driving.

The AVN apparatus 35 may output music or images in accordance with a user's input or display a route to a destination input by the user.

The HVAC apparatus 36 may draw external air into the vehicle 1 or circulate air inside the vehicle 1, and also heat or cool the indoor air in accordance with an indoor temperature of the vehicle 1 or a user command.

The body control module 37 may control operations of electrical parts to provide convenience to the driver or secure the safety of the driver. For example, the body control module 37 may control power seats, remote controlled door locks, power windows, head lamps, windscreen wipers, an instrument cluster, and multi-functional switches and the like installed in the vehicle 1.

The motion detecting apparatus 100 may detect a motion of the driver and provide information about the detected motion of the driver to the AVN apparatus 35, the HVAC apparatus 36, the body control module 37, and the like. The AVN apparatus 35, the HVAC apparatus 36, and the body control module 37, may determine a control command of the driver based on the information about the motion of the driver and operate in accordance with the determined control command.

Configurations and operations of the motion detecting apparatus 100 will be described below in more detail.

The electrical parts 30 may communication with each other via a network for vehicles NT. For example, the engine management system 31, the transmission control unit 32, the electronic braking system 33, the electric power steering 34, the AVN apparatus 35, the HVAC apparatus 36, the body control module 37, and the motion detecting apparatus 100 may transmit/receive data via the network for vehicles NT.

The network for vehicles NT may be networks using communication protocols such as Media Oriented Systems Transport (MOST), Flexray, Controller Area Network (CAN), and Local Interconnect Network (LIN). Also, the network for vehicles NT may use a plurality of communication protocols as well as a single communication protocols such as MOST, Flexray, CAN, and LIN.

These electrical parts 30 described above are only examples of the electrical parts equipped in the vehicle 1. Any electrical parts with different names from those of the aforementioned electrical parts 30, or additional electrical parts, may also be installed in the vehicle 1, or some of the aforementioned electrical parts 30 may be dispensed with.

Hereinafter, configuration and operation of the motion detecting apparatus 100 will be described in detail.

Figure 4:
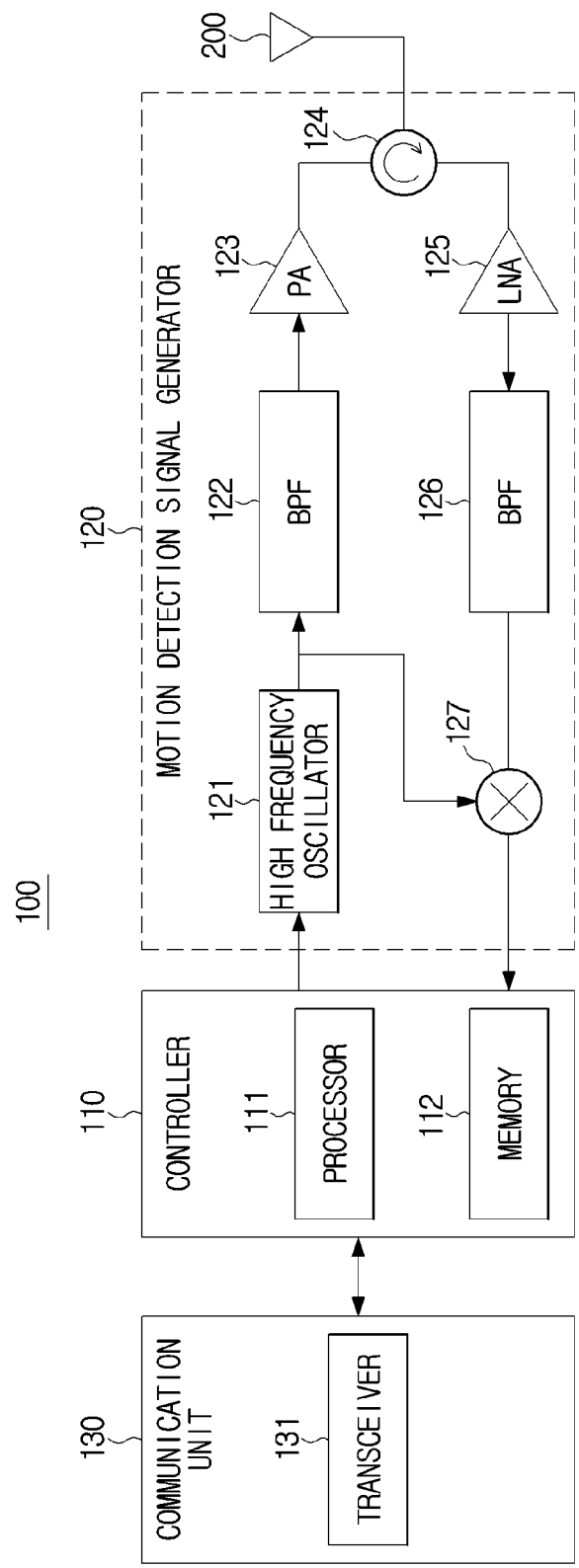
FIG. 4 is a block diagram of a motion detecting apparatus according to exemplary embodiments of the present disclosure.

FIG. 4 is a block diagram of a motion detecting apparatus according to exemplary embodiments of the present disclosure.

As illustrated in FIG. 4, the motion detecting apparatus 100 may include a motion detecting antenna 200, a motion detection signal generator 120, a communication unit 130 and a controller 110.

The communication unit 130 may include a transceiver 131 configured to transmit/receive a communication signal to/from the network for vehicles NT.

The transceiver 131 may modulate communication data of the controller 110 into a communication signal and transmit the modulated communication signal to the network for vehicles NT. Also, the transceiver 131 may receive the communication signal from the network for vehicles NT, demodulate the received communication signal into communication data, and output the demodulated communication data to the controller 110.

The motion detecting antenna 200 may receive a plurality of detection signals having different frequencies from the motion detection signal generator 120 and radiate a plurality of radio waves having different frequencies in different directions from different positions.

In this case, if an obstacle such as a body of the driver is located near the motion detecting antenna 200, the motion detecting antenna 200 cannot radiate the radio waves into a free space, and the body reflects the detection signal received from the motion detection signal generator 120 toward the motion detection signal generator 120. For example, the motion detecting antenna 200 may radiate a first radio wave having a first frequency from a first position in a first direction and a second radio wave having a second frequency from a second position in a second direction. If an obstacle such as the body of the driver is located in the first direction from the first position, the motion detecting antenna 200 cannot radiate the first radio wave having the first frequency and the body reflects the signal received from the motion detection signal generator 120.

In addition, if an obstacle such as the body of the driver is located near the motion detecting antenna 200, the radio wave output from the motion detecting antenna 200 may be reflected by the obstacle and incident on the motion detecting antenna 200. The motion detecting antenna 200 may receive the radio wave reflected by the obstacle and output a reflection signal corresponding to the received radio wave to the motion detection signal generator 120.

Structure and frequency characteristics of the motion detecting antenna 200 will be described below in detail.

The motion detection signal generator 120 may output a plurality of detection signals having different frequencies from the motion detecting antenna 200 and detect reflection signals reflected by the motion detecting antenna 200. For example, the motion detection signal generator 120 may output a first detection signal having a first frequency and a second detection signal having a second frequency. In addition, the motion detection signal generator 120 may detect a first reflection signal having the first frequency and a second reflection signal having the second frequency reflected by the motion detecting antenna 200.

The motion detection signal generator 120 may include a high frequency oscillator 121, a first band pass filter (BPF) 122, a power amplifier (PA) 123, a transmit/receive switch 124, a low noise amplifier (LAN) 125, a second band pass filter 126 and a frequency mixer 127.

The high frequency oscillator 121 may generate a plurality of signals having different frequencies in accordance with a control signal of the controller 110. For example, the high frequency oscillator 121 may generate the first detection signal having the first frequency and the second detection signal having the second frequency.

The high frequency oscillator 121 may include a frequency synthesizer. For example, the high frequency oscillator 121 may include a crystal oscillator, a phase detector, a charge pump, a loop filter, a voltage controlled oscillator (VCO) and a phase lock loop (PPL) provided with a frequency divider.

The first band pass filter 122 may transmit a signal having a predetermined frequency and block signals having the other frequencies except for the predetermined frequency. For example, the first band pass filter 122 may transmit the first detection signal having the first frequency and the second detection signal having the second frequency generated by the high frequency oscillator 121 and block signals having the other frequencies except for the first and second frequencies.

The power amplifier 123 may amplify power of the detection signal output from the first band pass filter 122, i.e., the detection signal to be output to the motion detecting antenna 200. For example, the power amplifier 123 may amplify power of the first detection signal having the first frequency and the second detection signal having the second frequency.

The transmit/receive switch 124 may selectively output the detection signal to the motion detecting antenna 200 or receive the reflection signal from the motion detecting antenna 200 depending on time or frequency. For example, the transmit/receive switch 124 may selectively output the first and second detection signals to the motion detecting antenna 200 or receive the first and second detection signals from the motion detecting antenna 200 depending on time or frequency.

The transmit/receive switch 124 may be a duplexer, a diplexer or the like.

The low noise amplifier 125 may amplify a signal output from the transmit/receive switch 124, i.e., the reflection signal reflected by the motion detecting antenna 200. For example, the power amplifier 123 may amplify a voltage of the first reflection signal having the first frequency or the second reflection signal having the second frequency.

The second band pass filter 126 may transmit a signal having a predetermined frequency and block signals having the other frequencies except for the predetermined frequency. For example, the second band pass filter 126 may transmit the first reflection signal having the first frequency and the second reflection signal having the second frequency and block signals having the other frequencies except for the first and second frequencies.

The frequency mixer 127 may mix the reflection signals output from the second band pass filter 126 and the detection signals output from the high frequency oscillator 121. In particular, the frequency mixer 127 may remove a frequency component of the detection signal from a spectrum of the reflection signal. For example, the frequency mixer 127 may output a low frequency first reflection signal by removing a first frequency component from the first reflection signal having the first frequency and a low frequency second reflection signal by removing a second frequency component from the second reflection signal having the second frequency.

The controller 110 may include a processor 111 configured to generate a control signal to control operation of the motion detecting apparatus 100 and a memory 112 configured to store programs and data to control operation of the motion detecting apparatus 100.

The processor 111 may generate the control signal to be output to the motion detection signal generator 120 in accordance with the programs and data stored in the memory 112 and process the reflection signal of the motion detecting antenna 200 received from the motion detection signal generator 120. Also, the processor 111 may recognize a motion of the user in accordance with the reflection signal received from the motion detection signal generator 120 and generate information about the motion of the user.

For example, in accordance with a request for detecting a motion received via the communication unit 130, the processor 111 may output a control signal to the motion detection signal generator 120 to allow the motion detection signal generator 120 to output a plurality of detection signals having different frequencies to the motion detecting antenna 200.

Also, the processor 111 may process the reflection signal output from the motion detecting antenna 200 and determine the motion of the driver depending on the reflection signal. In particular, the processor 111 may determine a position of the body of the driver depending on the reflection signal from the motion detecting antenna 200 and may also judge a movement of the body of the driver in accordance with a change in the reflection signal reflected by the motion detecting antenna 200.

Also, the processor 111 may generate information about the motion of the driver and transmit the generated information to the network for vehicles NT via the communication unit 130.

The memory 112 may store programs and data to control operations of the motion detecting apparatus 100 and temporarily store data about the reflection signal and information about the motion of the driver obtained during operations of the processor 111.

Examples of the memory 112 may include volatile memories such as static random access memory (S-RAM) and dynamic random access memory (D-RAM) and non-volatile memories such as read only memory (ROM), erasable programmable read only memory (EPROM), electrically erasable programmable read only memory (EEPROM), and flash memory. The non-volatile memory may store programs and data to control operations of the motion detecting apparatus 100, and the volatile memory may store data about the reflection signal, information about the motion of the driver, and the like.

The aforementioned processor 111 and memory 112 may be implemented as separate chips or integrated into a single chip. For example, one single chip may include a processor block and a memory block.

The controller 110 may also be referred to as a central processing unit (CPU), an electronic control unit (ECU), a micro controller unit (MCU), an application processor (AP), or the like, without being limited thereto.

As described above, the controller 110 may process the reflection signal of the motion detecting antenna 200 received from the motion detection signal generator 120 and generate information about the motion of the driver based on the reflection signal.

The configuration of the motion detecting apparatus 100 has been described above. Hereinafter, configuration and frequency characteristics of the motion detecting antenna 200 will be described.

Figure 5:
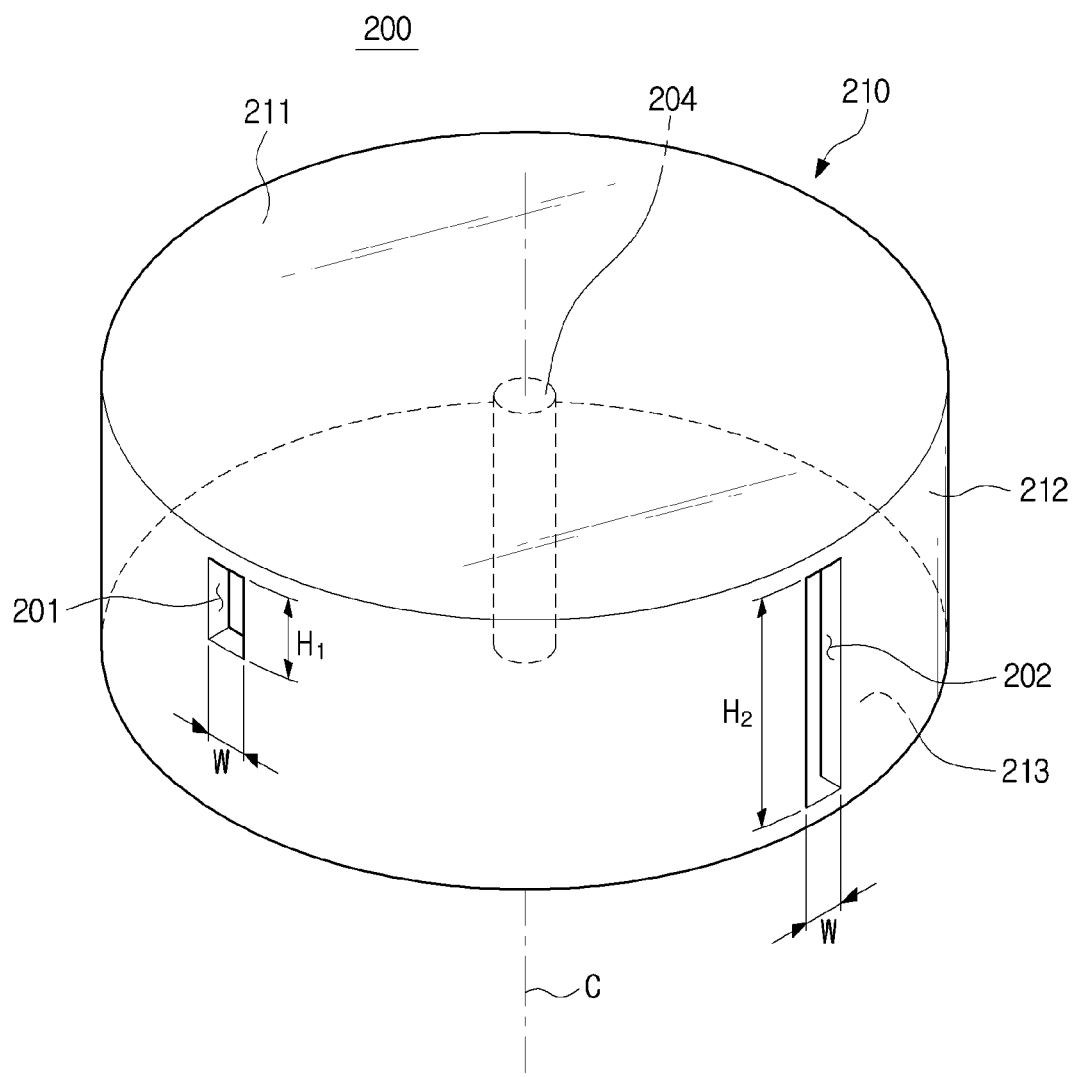
FIG. 5 is a view of a motion detecting antenna according to exemplary embodiments of the present disclosure.
Figure 6:
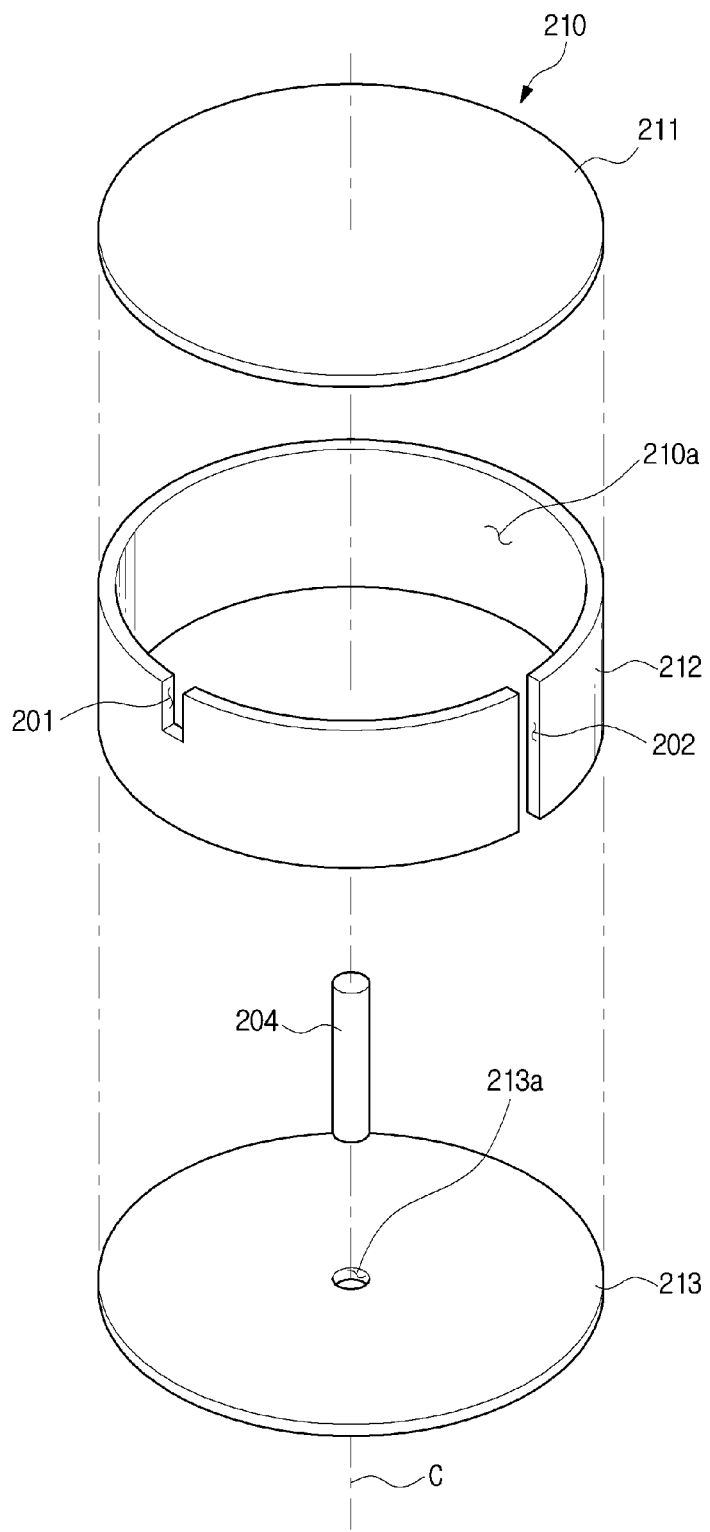
FIG. 6 is an exploded view of the motion detecting antenna of FIG. 5.
Figure 7:
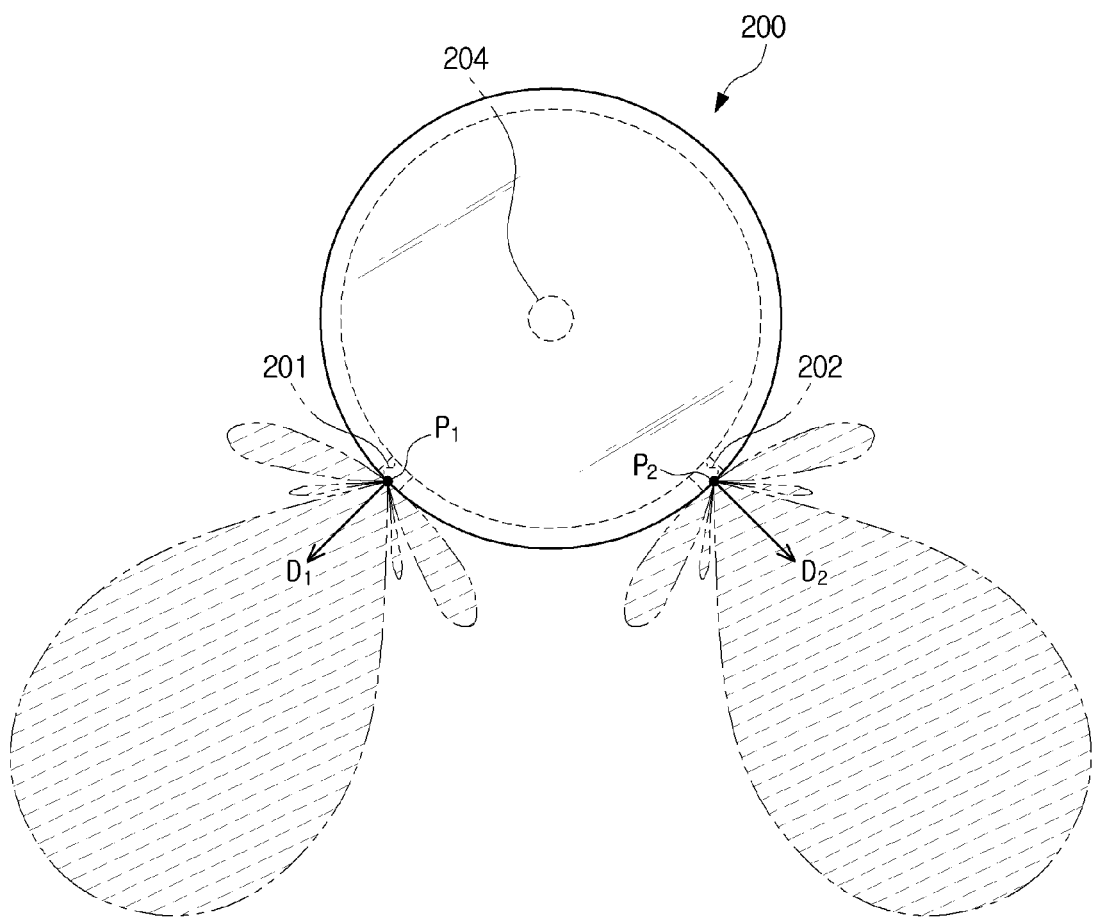
FIG. 7 is a view illustrating a radiation pattern of the motion detecting antenna of FIG. 5.
Figure 8:
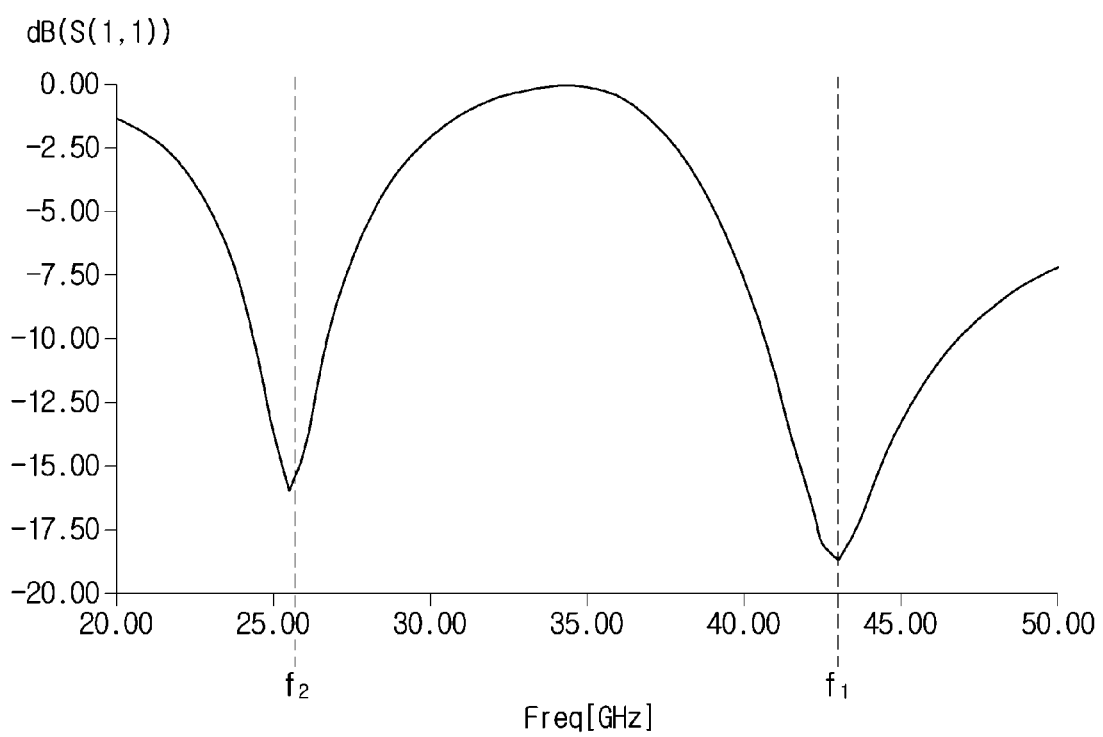
FIG. 8 is a graph illustrating frequency characteristics of the motion detecting antenna of FIG. 5.

FIG. 5 is a view of a motion detecting antenna according to exemplary embodiments. FIG. 6 is an exploded view of the motion detecting antenna of FIG. 5. FIG. 7 is a view illustrating a radiation pattern of the motion detecting antenna of FIG. 5. FIG. 8 is a graph illustrating frequency characteristics of the motion detecting antenna of FIG. 5.

Referring to FIGS. 5 and 6, the motion detecting antenna 200 includes an antenna body 210 defining an appearance of the motion detecting antenna 200 and a plurality of slots 201 and 202 formed along a side surface 212 of the antenna body 210.

The antenna body 210 may have a cylindrical shape with upper and lower surfaces 211 and 213, i.e., an upper surface 211 and a lower surface 213. The antenna body 210 may have the upper surface 211, a side surface 212, and the lower surface 213.

The upper surface 211 and the lower surface 213 may have circular shapes, and the side surface 212 may be disposed between the upper surface 211 and the lower surface 213 and be perpendicular to both the upper surface 211 and the lower surface 213. Also, the upper surface 211, the side surface 212, and the lower surface 213 constituting the antenna body 210 may be formed of conductive materials.

A radiation cavity 210a may be defined by the upper surface 211, the side surface 212, and the lower surface 213 in the antenna body 210, and a feed pin 204 may be provided in the radiation cavity 210a.

The feed pin 204 may extend from the outside of the antenna body 210 into the radiation cavity 210a formed in the antenna body 210 through the lower surface 213 of the antenna body 210. For example, a through-hole 213a may be formed at a central region of the lower surface 213 of the antenna body 210. The feed pin 204 may extend from the outside into the radiation cavity 210a in the antenna body 210 via the through-hole 213a of the lower surface 213.

The feed pin 204 may extend from the lower surface 213 of the antenna body 210 toward the upper surface 211 of the antenna body 210 along a central axis C of the antenna body 210.

In addition, the feed pin 204 may not be in direct contact with both the upper surface 211 and the lower surface 213 of the antenna body 210 and may be electrically insulated from the antenna body 210.

The feed pin 204 may radiate radio waves into the radiation cavity 210a. Particularly, the detection signal output from the motion detection signal generator 120 (FIG. 4) is fed into the feed pin 204, and an electromagnetic field having the same frequency as that of the detection signal may be induced around the feed pin 204 by the detection signal of the motion detection signal generator 120 (FIG. 4). Also, the electromagnetic field induced in the radiation cavity 210a may resonate in the radiation cavity 210a in accordance with the shape and size of the antenna body 210.

In the same manner, the radio wave having the same frequency as that of the detection signal may be radiated into the radiation cavity 210a from the feed pin 204.

A plurality of slots, first slot and second slot 201 and 202, may be formed at the side surface 212 along a circumferential direction of the antenna body 210.

The first slot 201 and the second slot 202 may be formed through the side surface 212 of the antenna body 210. The free space outside the antenna body 210 may be connected to the radiation cavity 210a in the antenna body 210 through the first slot 201 and the second slot 202. As a result, the electromagnetic field resonating in the radiation cavity 201a may be radiated into the free space through the first slot 201 and the second slot 202. In other words, the radio waves may be radiated through the first slot 201 and the second slot 202.

The first slot 201 and the second slot 202 may be located at different positions along the circumferential direction of the antenna body 210. For example, the first slot 201 may be disposed at a first position P1 and the second slot 202 may be disposed at a second position P2 spaced 90 degrees apart from the first position P1 along the circumferential direction of the antenna body 210.

Since the first slot 201 and the second slot 202 are disposed at different positions along the circumferential direction of the antenna body 210, the radio waves may be radiated from different positions through the first slot 201 and the second slot 202. For example, the radio waves may be radiated into the free space from the first position P1 through the first slot 201 and from the second position P2 through the second slot 202 as illustrated in FIG. 7.

Also, the first slot 201 and the second slot 202 may be formed to face different directions along the circumferential direction of the antenna body 210. For example, as illustrated in FIG. 7, the first slot 201 may be formed to face a first direction D1, and the second slot 202 may be formed to face a second direction D2 spaced 90 degrees apart from the first direction D1.

Since the first slot 201 and the second slot 202 are formed to face different directions to be space apart from each other along the circumferential direction of the antenna body 210 as described above, the radio waves may be radiated in different directions through the first slot 201 and the second slot 202. For example, radio waves may be radiated in the first direction D1 through the first slot 201 and in the second direction D2 through the second slot 202 as illustrated in FIG. 7.

The first slot 201 and the second slot 202 may have different sizes. For example, the first slot 201 and the second slot 202 may have the same width W, but a height H1 of the first slot 201 may be different from a height H2 of the second slot 202.

Since the first slot 201 and the second slot 202 have different sizes, a radio wave radiated through the first slot 201 may have a frequency different from that of a radio wave radiated through the second slot 202. For example, the radio wave radiated through the first slot 201 may have a first frequency f1, and the radio wave radiated through the second slot 202 may have a second frequency f2.

Referring to FIG. 8, illustrating a S11-parameter of the motion detecting antenna 200, the S11-parameter has minimum values at the first frequency f1 (about 42 GHz) and the second frequency f2 (about 26 GHz). Since the S11-parameter indicates the intensity of a signal reflected by an antenna with respect to the intensity of a signal input to the antenna, a smaller S11-parameter indicates that signals are radiated into the free space through the antenna. Thus, the minimum values observed at the first frequency f1 (about 42 GHz) and the second frequency f2 (about 26 GHz) indicate that the motion detecting antenna 200 radiates radio waves having the first frequency f1 (about 42 GHz) and the second frequency f2 (about 26 GHz) into the free space.

As described above, the motion detecting antenna 200 may include the antenna body 210 having the first slot 201 and the second slot 202 through which the radio waves are radiated, and the first slot 201 and the second slot 201 may have different sizes H1 and H2 in different directions D1 and D2 at different positions P1 and P2.

As a result, radio waves having the different frequencies f1 and f2 may be radiated in different directions D1 and D2 through the first slot 201 and the second slot 202 from the different positions P1 and P2. Thus, the motion detecting apparatus 100 including the motion detecting antenna 200 may detect the position of the body U of the driver.

Figure 9:
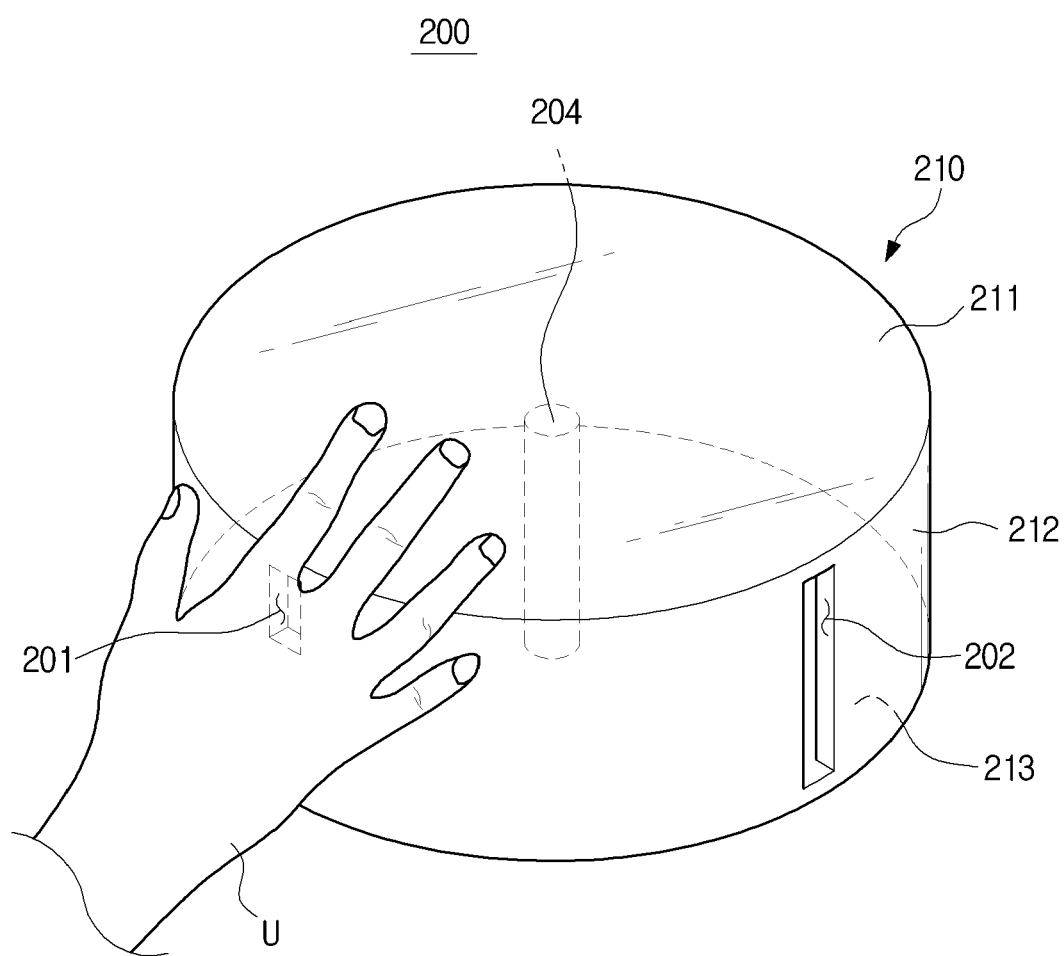
FIG. 9 illustrates one example of a motion detecting antenna according to exemplary embodiments of the present disclosure when a body of a user is located near the motion detecting antenna.
Figure 10:
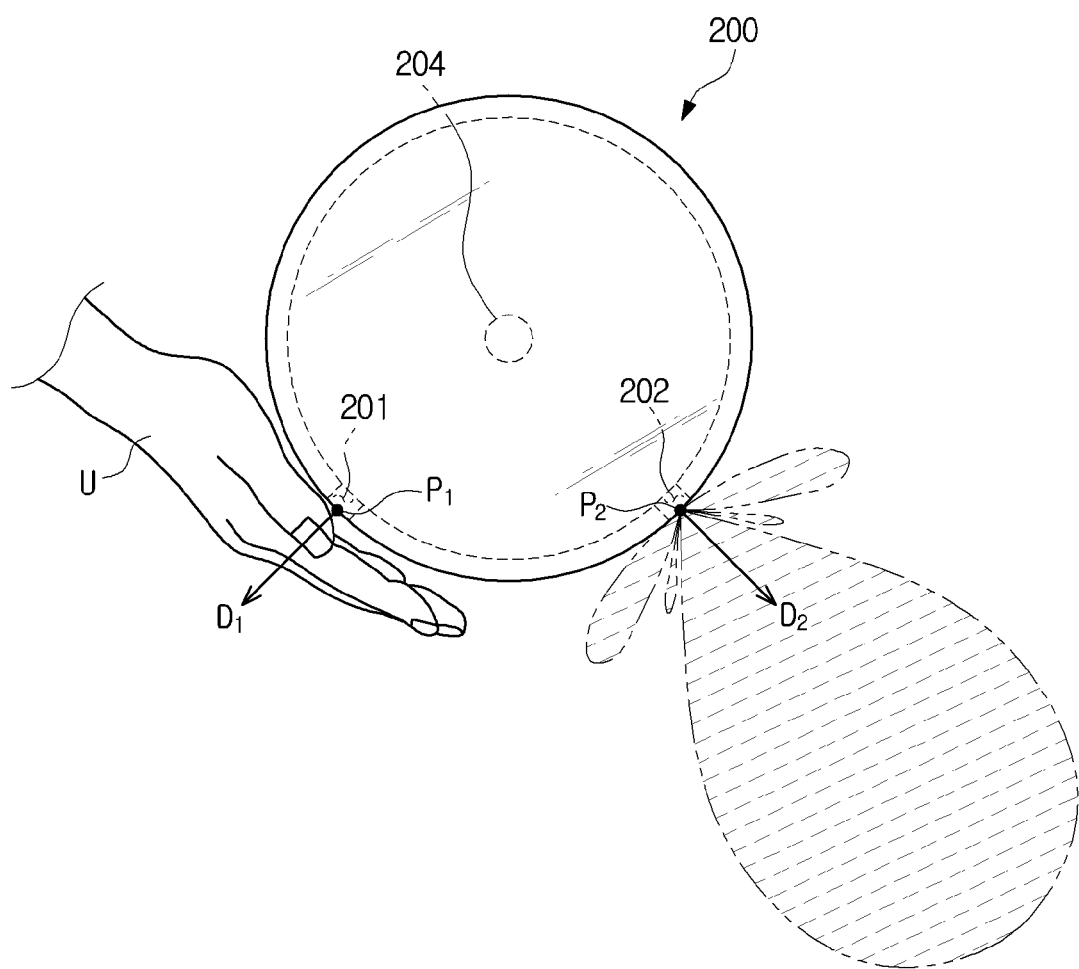
FIG. 10 is a view illustrating a radiation pattern of the motion detecting antenna when the body of the user is located near the motion detecting antenna of FIG. 9.
Figure 11:
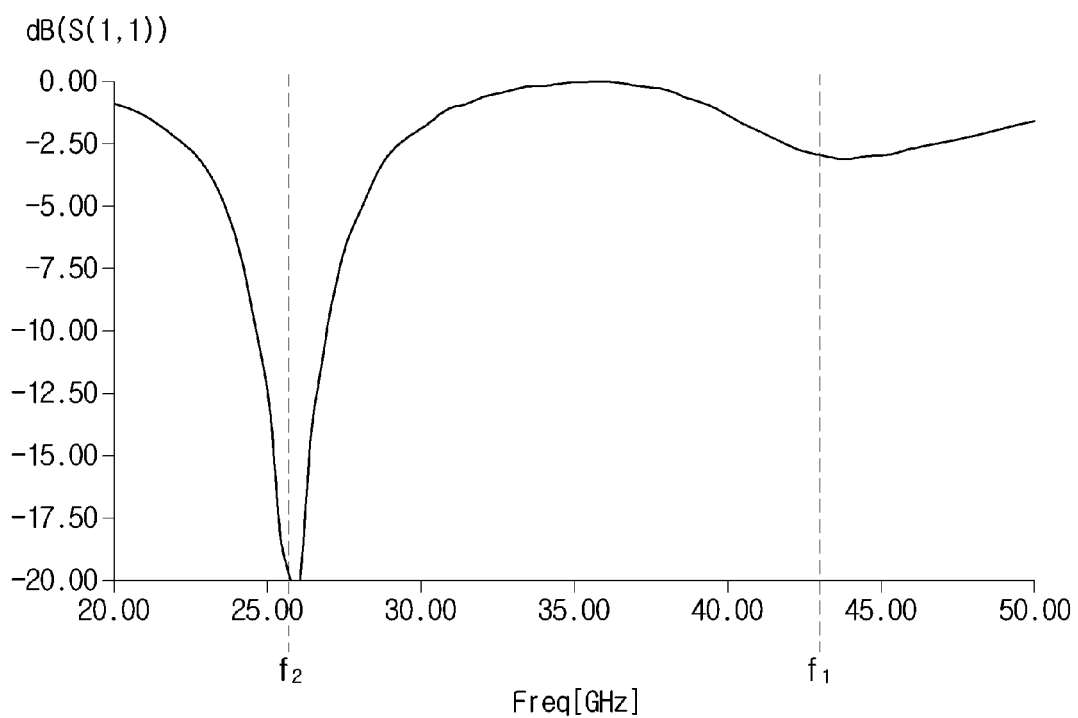
FIG. 11 is a graph illustrating frequency characteristics of the motion detecting antenna when the body of the user is located near the motion detecting antenna of FIG. 9.

FIG. 9 illustrates one example of a motion detecting antenna according to exemplary embodiments of the present disclosure when a body of a user is located near the motion detecting antenna. FIG. 10 is a view illustrating a radiation pattern of the motion detecting antenna when the body of the user is located near the motion detecting antenna of FIG. 9. FIG. 11 is a graph illustrating frequency characteristics of the motion detecting antenna when the body of the user is located near the motion detecting antenna of FIG. 9.

As describe above, the motion detecting antenna 200 may radiate the radio waves having the different frequencies f1 and f2 through the first slot 201 and the second slot 202 from the different positions P1 and P2 in the different directions D1 and D2. For example, the motion detecting antenna 200 may radiate the radio wave having the first frequency f1 through the first slot 201 from the first position P1 in the first direction D1 and the radio wave having the second frequency f2 through the second slot 202 from the second position P2 in the second direction D2.

In this case, the body U of the driver located near the motion detecting antenna 200 may hinder radiation of the radio waves from the motion detecting antenna 200.

For example, the body U of the driver located near the first slot 201 of the antenna body 210 as illustrated in FIG. 9 may hinder radiation of the radio wave through the first slot 201. In particular, while the second radio wave having the second frequency f2 may be radiated through the second slot 202, the first radio wave having the first frequency f1 cannot be radiated through the first slot 201 as illustrated in FIG. 10.

This is because the shape of the first slot 201 radiating the radio wave is substantially modified by the body U of the driver, and the modified shape of the first slot 201 may change the frequency of the radio wave radiated through the first slot 201.

In other words, if the body U of the driver is located near the first slot 201, a radio wave having a frequency different from the first frequency f1 is radiated through the first slot 201 and the first radio wave having the first frequency f1 cannot be radiated through the first slot 201.

As a result, frequency characteristics of the motion detecting antenna 200 may be changed. For example, if the body U of the driver is located near the first slot 201, frequency characteristics of the motion detecting antenna 200 may be as illustrated in FIG. 11.

Referring to FIG. 11, the S11-parameter of the motion detecting antenna 200 has a minimum vale of −20 dB or less at the second frequency f2 (about 26 GHz) but does not have a minimum vale of −20 dB or less at the first frequency f1 (about 42 GHz).

As a result, the motion detecting antenna 200 may radiate the second radio wave having the second frequency f2 (about 26 GHz) into the free space but cannot radiate the first radio wave having the first frequency f1 (about 42 GHz) into the free space.

The first radio wave having the first frequency f1, which has not been radiated, may be reflected to the motion detection signal generator 120 (FIG. 4). As described above, the motion detection signal generator 120 (FIG. 4) may provide the first detection signal having the first frequency and the second detection signal having the second frequency to the motion detecting antenna 200. In this case, if the body U of the driver is located near the first slot 201, the motion detecting antenna 200 cannot radiate the first radio wave having the first frequency into the free space but outputs the first reflection signal having the first frequency to the motion detection signal generator 120 (FIG. 4).

The case in which radiation of the radio waves is hindered by the body U of the driver has been described above. However, depending on a distance between the body U of the driver and the first slot 201, the radio wave radiated through the first slot 201 may be reflected by the body U of the driver, and the motion detecting antenna 200 may receive the reflected radio wave through the first slot 201.

In other words, if the body U of the driver is located near the first slot 201, the motion detecting antenna 200 may receive a radio wave reflected by the body U of the driver and output a first reflection signal having the first frequency to the motion detection signal generator 120 (as shown in FIG. 4) in response to the reflected radio wave.

If the body U of the driver is located near the first slot 201, the motion detecting antenna 200 may output the first reflection signal having the first frequency obtained by hindered radiation of the first radio wave or the first reflection signal having the first frequency obtained by receiving the radio wave reflected by the body U of the driver.

Figure 12:
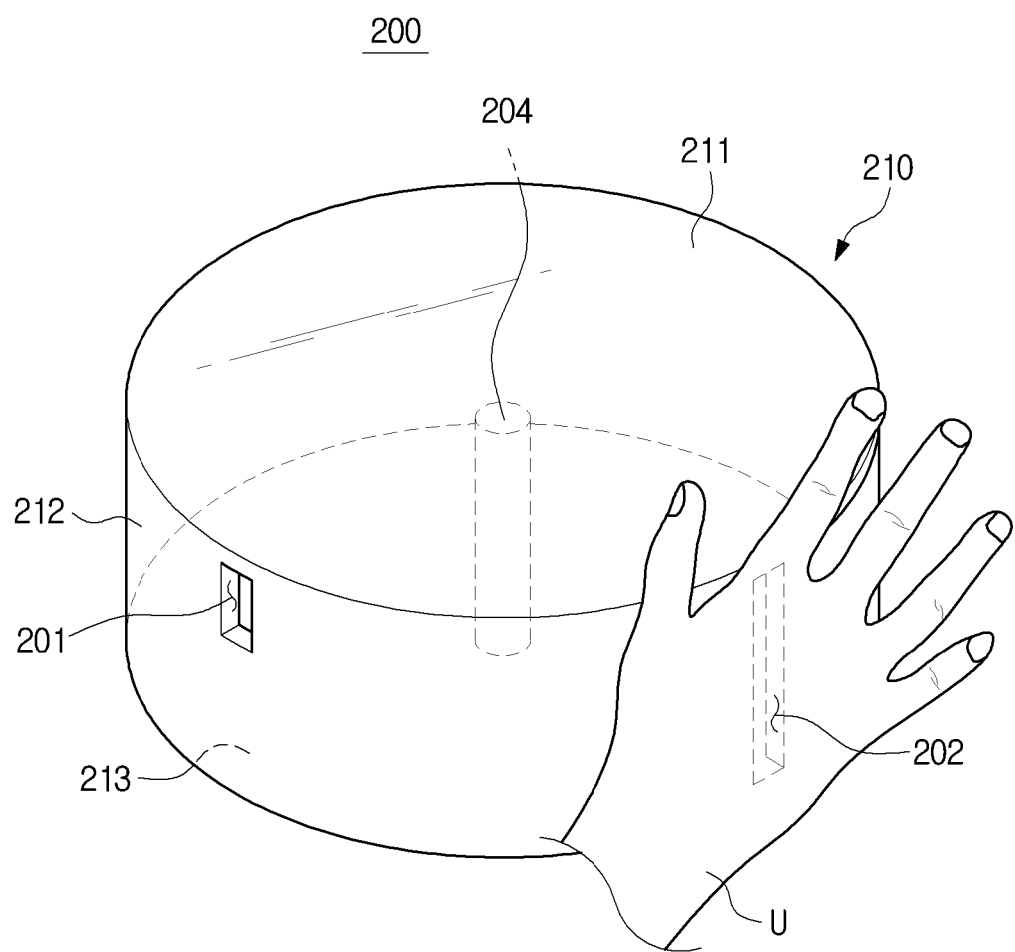
FIG. 12 illustrates an example of a motion detecting antenna when a body of a user is located near the motion detecting antenna according to exemplary embodiments of the present disclosure.
Figure 13:
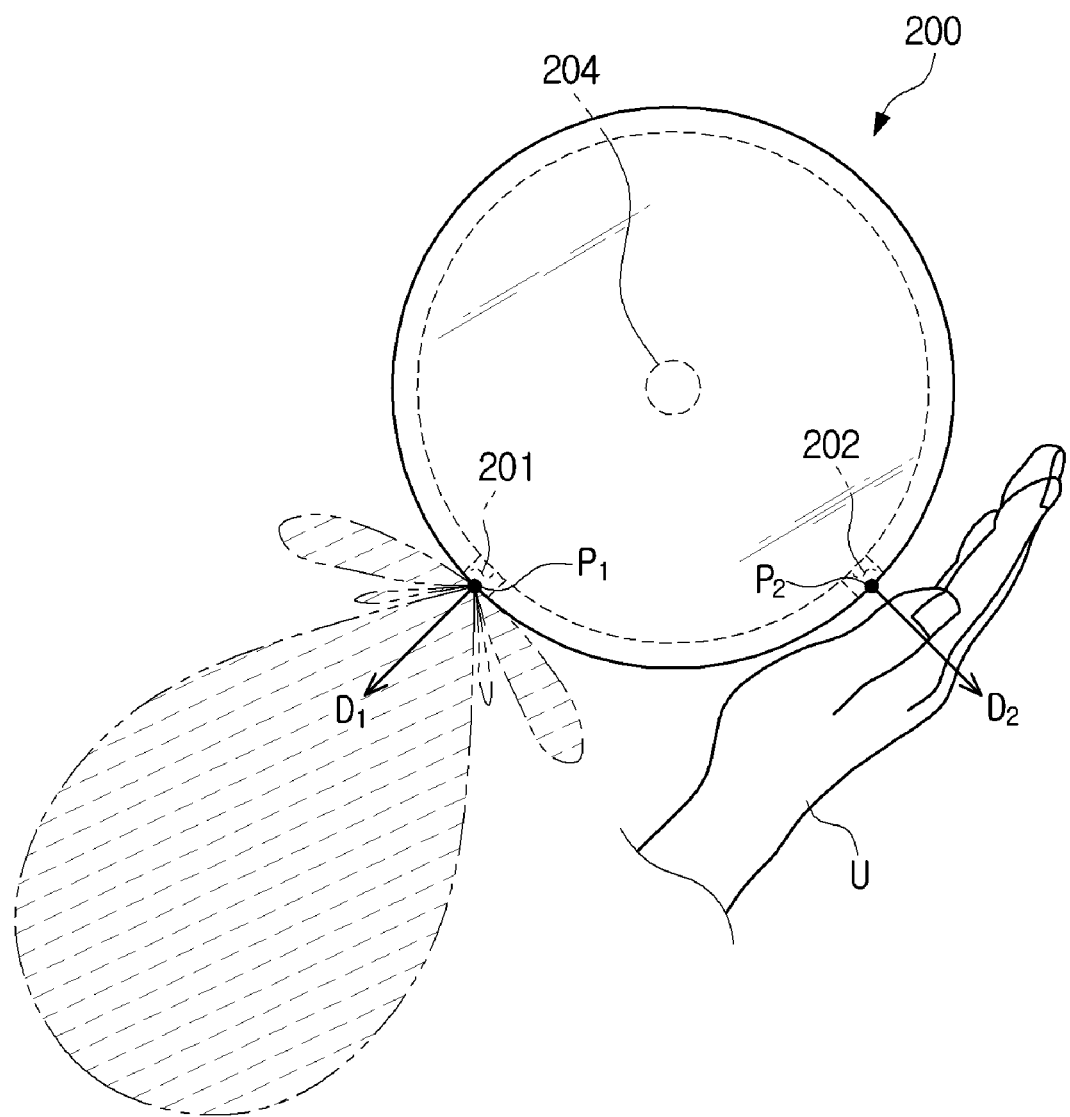
FIG. 13 is a view illustrating a radiation pattern of the motion detecting antenna when the body of the user is located near the motion detecting antenna of FIG. 12.
Figure 14:
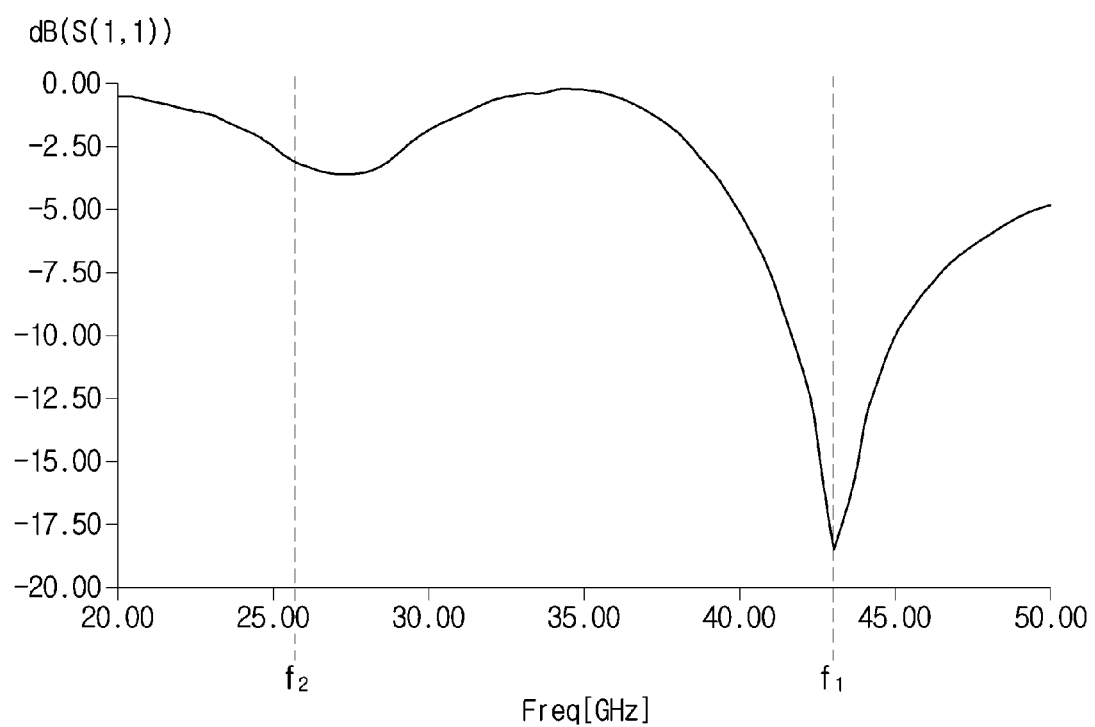
FIG. 14 is a graph illustrating frequency characteristics of the motion detecting antenna when the body of the user is located near the motion detecting antenna of FIG. 12.

FIG. 12 illustrates an example of a motion detecting antenna when a body of a user is located near the motion detecting antenna. FIG. 13 is a view illustrating a radiation pattern of the motion detecting antenna when the body of the user is located near the motion detecting antenna of FIG. 12. FIG. 14 is a graph illustrating frequency characteristics of the motion detecting antenna when the body of the user is located near the motion detecting antenna of FIG. 12.

As describe above, the body U of the driver located near the motion detecting antenna 200 may hinder radiation of the radio waves from the motion detecting antenna 200.

For example, the body U of the driver located near the second slot 202 of the antenna body 210 as illustrated in FIG. 12 may hinder radiation of the radio wave through the second slot 202. In particular, while the first radio wave having the first frequency f1 may be radiated through the first slot 201, the second radio wave having the second frequency f2 cannot be radiated through the second slot 202 as illustrated in FIG. 13.

This is because the shape of the second slot 202 radiating the radio wave is substantially modified by the body U of the driver, and the modified shape of the second slot 202 may change the frequency of the radio wave radiated through the second slot 202.

In other words, if the body U of the driver is located near the second slot 202, a radio wave having a frequency different from the second frequency f2 is radiated through the second slot 202 and the second radio wave having the second frequency f2 cannot be radiated through the second slot 202.

As a result, frequency characteristics of the motion detecting antenna 200 may be changed. For example, if the body U of the driver is located near the second slot 202, frequency characteristics of the motion detecting antenna 200 may be as illustrated in FIG. 14.

Referring to FIG. 14, the S11-parameter of the motion detecting antenna 200 has a minimum vale of −20 dB or less at the first frequency f1 (about 42 GHz) but does not have a minimum vale of −20 dB or less at the second frequency f2 (about 26 GHz).

As a result, the motion detecting antenna 200 may radiate the first radio wave having the first frequency f1 (about 42 GHz) into the free space but cannot radiate the second radio wave having the second frequency f2 (about 26 GHz) into the free space.

The second radio wave having the second frequency f2, which has not been radiated, may be reflected to the motion detection signal generator 120 (FIG. 4). As described above, the motion detection signal generator 120 (FIG. 4) may provide the first detection signal having the first frequency and the second detection signal having the second frequency to the motion detecting antenna 200. In this case, if the body U of the driver is located near the first slot 201, the motion detecting antenna 200 cannot radiate the second radio wave having the second frequency into the free space but outputs the second reflection signal having the second frequency to the motion detection signal generator 120 (as shown in FIG. 4).

The case in which radiation of the radio waves is hindered by the body U of the driver has been described above. However, the radio wave radiated through the second slot 202 may be reflected by the body U of the driver, and the motion detecting antenna 200 may receive the reflected radio wave through the second slot 202 depending on a distance between the body U of the driver and the second slot 202.

In other words, if the body U of the driver is located near the second slot 202, the motion detecting antenna 200 may receive a radio wave reflected by the body U of the driver and output the second reflection signal having the second frequency to the motion detection signal generator 120 (FIG. 4) in response to the reflected radio wave.

If the body U of the driver is located near the second slot 202, the motion detecting antenna 200 may output the second reflection signal having the second frequency obtained by hindered radiation of the first radio wave or the second reflection signal having the second frequency obtained by receiving the radio wave reflected by the body U of the driver.

Figure 15:
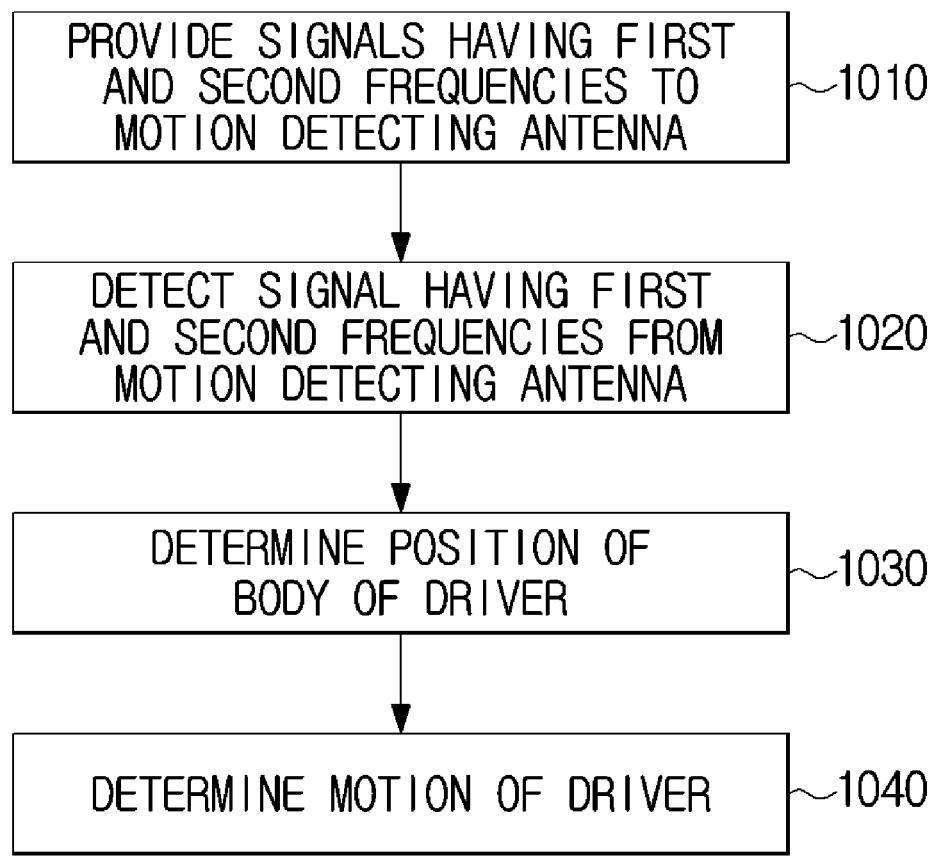
FIG. 15 is a flowchart illustrating operations of a motion detecting apparatus according to exemplary embodiments of the present disclosure.
Figure 16:
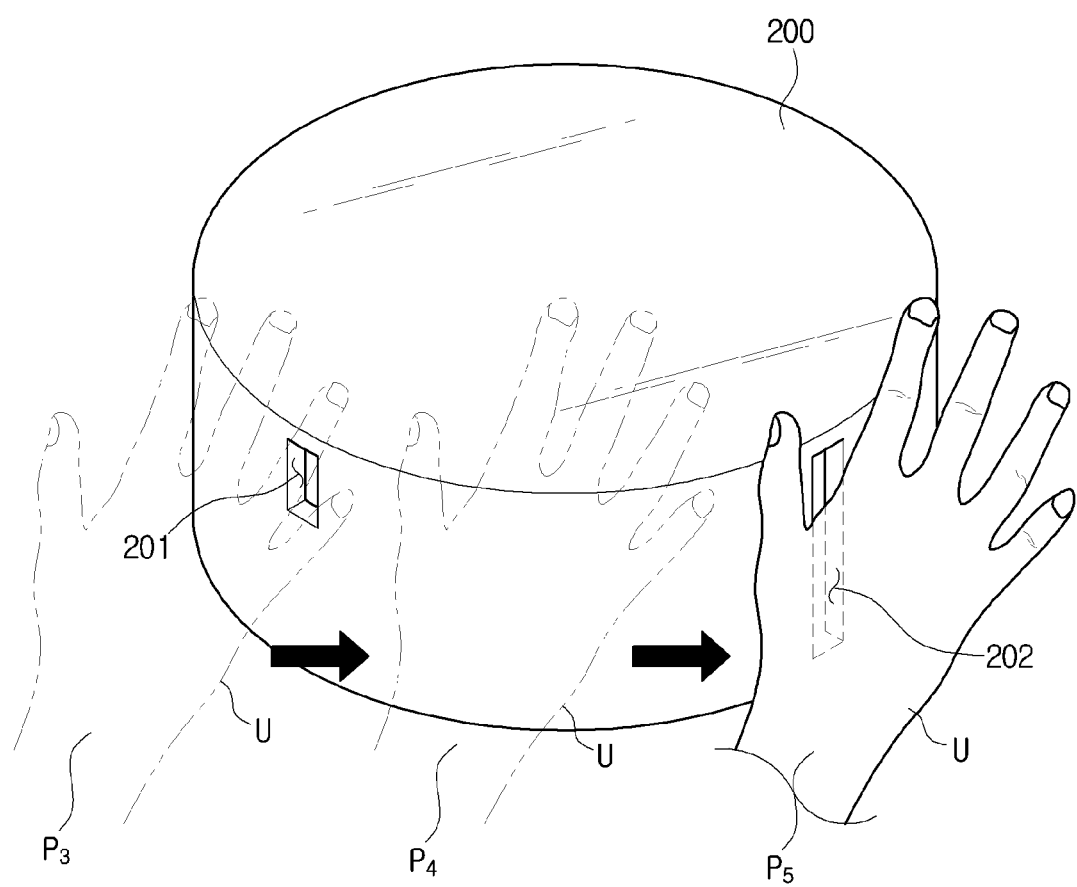
FIG. 16 is a view illustrating movement of a body of a driver near a motion detecting apparatus according to exemplary embodiments of the present disclosure.

FIG. 15 is a flowchart illustrating operations of a motion detecting apparatus according to exemplary embodiments of the present disclosure. FIG. 16 is a view illustrating movement of a body of a driver near a motion detecting apparatus according to exemplary embodiments of the present disclosure. FIG. 17 illustrates changes in frequency characteristics of the motion detecting antenna in accordance with movement of the body of the driver of FIG. 16.

Referring to FIGS. 15, 16 and 17, a motion detecting method 1000 of the motion detecting apparatus 100 will be described.

The motion detecting apparatus 100 provides the first detection signal having the first frequency and the second detection signal having the second frequency to the motion detecting antenna 200 (1010).

The controller 110 of the motion detecting apparatus 100 may output a control signal to the motion detection signal generator 120 to output the first detection signal having the first frequency and the second detection signal having the second frequency to the motion detecting antenna 200.

The motion detection signal generator 120 may generate the first detection signal having the first frequency and the second detection signal having the second frequency in accordance with the control signal of the controller 110 and provide the first detection signal and the second detection signal to the motion detecting antenna 200. In addition, the motion detecting antenna 200 may radiate the first radio wave having the first frequency and the second radio wave having the second frequency in accordance with the supply of the first detection signal and second detection signal In this case, the motion detection signal generator 120 may simultaneously provide the first and second detection signals to the motion detecting antenna 200 or alternately provide the first and second detection signals to the motion detecting antenna 200.

For example, the high frequency oscillator 121 of the motion detection signal generator 120 may simultaneously generate the first detection signal having the first frequency and the second detection signal having the second frequency. The first detection signal and the second detection signal may simultaneously be provided to the motion detecting antenna 200 via the first band pass filter 122, the power amplifier 123, and the transmit/receive switch 124. As a result, the motion detecting antenna 200 may simultaneously radiate the first radio wave having the first frequency and the second radio wave having the second frequency.

As another example, the high frequency oscillator 121 of the motion detection signal generator 120 may alternately generate the first detection signal having the first frequency and the second detection signal having the second frequency. In other words, the high frequency oscillator 121 may generate the first detection signal during a predetermined time period and generate the second detection signal during a next predetermined time period. As a result, the motion detecting antenna 200 may alternately radiate the first radio wave having the first frequency and the second radio wave having the second frequency. In other words, the motion detecting antenna 200 may radiate the first radio wave during the predetermined time period and the second radio wave during the next predetermined time period.

Then, the motion detecting apparatus 100 may detect a first signal having the first frequency or a second signal having the second frequency from the motion detecting antenna 200 (1020).

In response to the supply of the first and second detection signals, the motion detecting antenna 200 may radiate the first radio wave having the first frequency and the second radio wave having the second frequency.

In this case, when the body U of the driver is located near the motion detecting antenna 200, the motion detecting antenna 200 may output the first reflection signal having the first frequency or the second reflection signal having the second frequency to the motion detection signal generator 120 in accordance with the position of the body U of the driver.

For example, when the body U of the driver is located at a third position P3 near the first slot 201, as illustrated in FIG. 16, the motion detecting antenna 200 may output the first reflection signal having the first frequency to the motion detection signal generator 120.

Figure 17A:
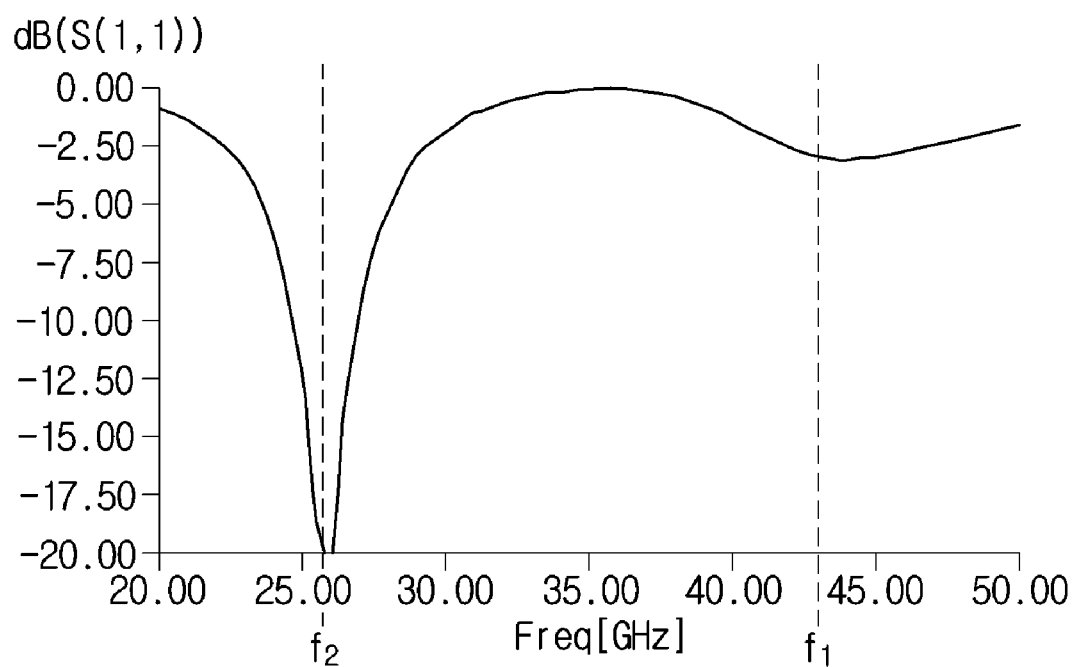
FIGS. 17a-c are graphs illustrating changes in frequency characteristics of the motion detecting antenna in accordance with movement of the body of the driver of FIG. 16.

When the body U of the driver is located near the first slot 201, radiation of the first radio wave having the first frequency is hindered, and frequency characteristics of the motion detecting antenna 200 may be as illustrated in FIG. 17*a*. As a result, the first radio wave having the first frequency cannot be radiated, and the first reflection signal having the first frequency may be output to the motion detection signal generator 120.

Even when the first radio wave having the first frequency is radiated from the motion detecting antenna 200, the radiated first radio wave may also be reflected by the body U of the driver. The motion detecting antenna 200 may receive the first radio wave reflected by the body U of the driver and output the first reflection signal having the first frequency to the motion detection signal generator 120 in response to the received first radio wave.

As another example, when the body U of the driver is located at a fourth position P4 between the first slot 201 and the second slot 202, as illustrated in FIG. 16, the reflection signal may not be generated.

Figure 17B:
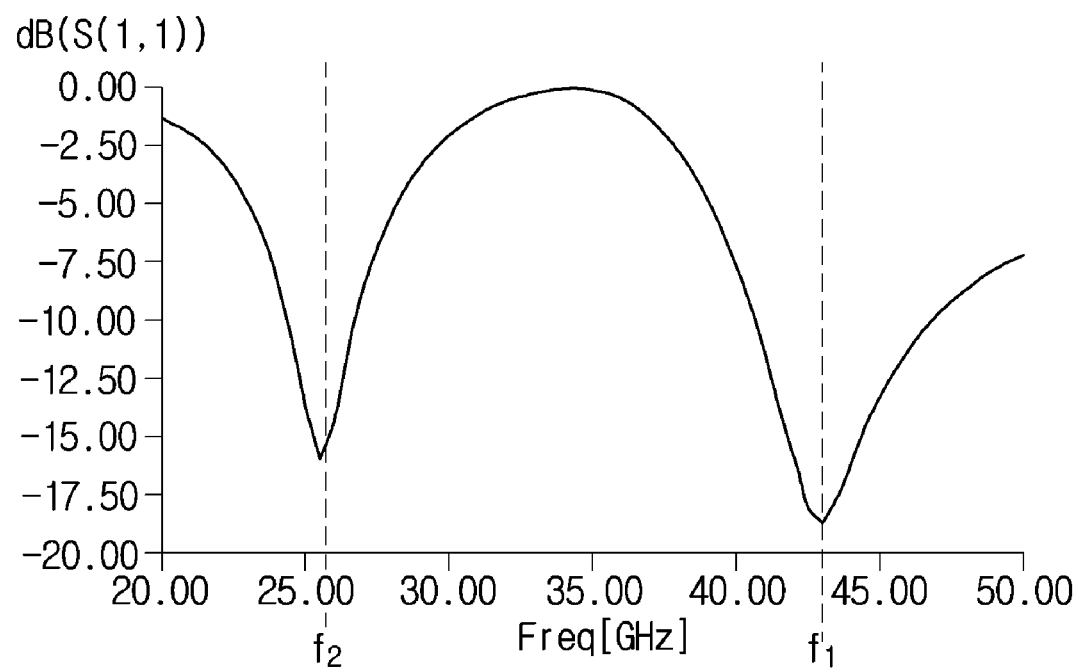

When the body U of the driver is located between the first slot 201 and the second slot 202, radiation of the first radio wave and the second radio wave is not hindered, and thus the frequency characteristics of the motion detecting antenna 200 may be as illustrated in FIG. 17*b*. Thus, both the first radio wave having the first frequency and the second radio wave having the second frequency may be radiated into the free space, and the reflection signal is not output from the motion detecting antenna 200 to the motion detection signal generator 120.

As another example, when the body U of the driver is located at a fifth position P5 near the second slot 202 as illustrated in FIG. 16, the motion detecting antenna 200 may output the second reflection signal having the second frequency to the motion detection signal generator 120.

Figure 17C:
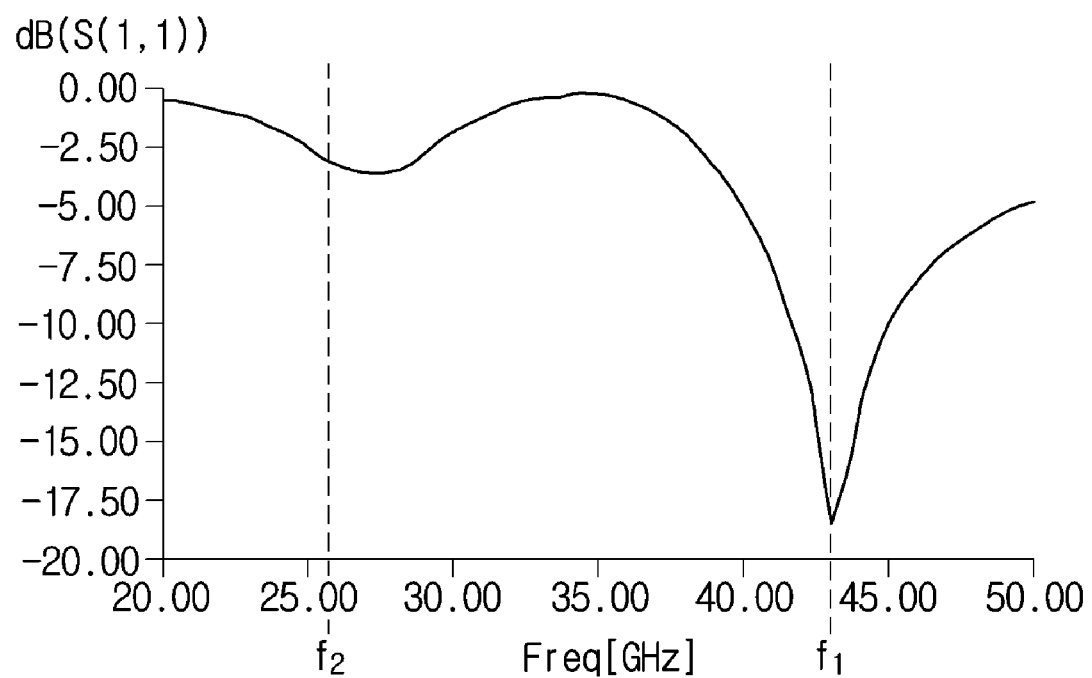

When the body U of the driver is located near the second slot 202, radiation of the second radio wave having the second frequency is hindered, and frequency characteristics of the motion detecting antenna 200 may be as illustrated in FIG. 17*c*. As a result, the second radio wave having the second frequency cannot be radiated, and the second reflection signal having the second frequency may be output to the motion detection signal generator 120.

Even when the second radio wave having the second frequency is radiated from the motion detecting antenna 200, the radiated second radio wave may also be reflected by the body U of the driver. The motion detecting antenna 200 may receive the second radio wave reflected by the body U of the driver and output the second reflection signal having the second frequency to the motion detection signal generator 120 in response to the received second radio wave.

As described above, the motion detecting antenna 200 may output the first reflection signal or the second reflection signal to the motion detection signal generator 120 in accordance with the position of the body U of the driver, and the first or second reflection signal may be provided to the controller 110 via the transmit/receive switch 124, the second band pass filter 126 and the frequency mixer 127.

The controller 110 of the motion detecting apparatus 100 may detect the first or second reflection signal in accordance with the position of the body U of the driver.

Then, the motion detecting apparatus 100 determines the position of the body U of the driver based on the detected signal (1030).

The controller 110 of the motion detecting apparatus 100 may determine the position of the body U of the driver depending on the reflection signal received from the motion detecting antenna 200 via the motion detection signal generator 120.

For example, upon receiving the first reflection signal having the first frequency, the controller 110 may determine that the body U of the driver is located near the first slot 201 of the motion detecting antenna 200.

As another example, if the reflection signal is not received, the controller 110 may determine that the body U of the driver is located far away from both the first slot 201 and the second slot 202 of the motion detecting antenna 200.

As another example, upon receiving the second reflection signal having the second frequency, the controller 110 may determine that the body U of the driver is located near the second slot 202 of the motion detecting antenna 200.

Then, the motion detecting apparatus 100 determines the motion of the driver based on the position of the body U of the driver (1040).

The controller 110 of the motion detecting apparatus 100 may determine the motion of the driver based on changes in the positions of the body U of the driver.

For example, if the body U of the driver moves from the third position P3 to the fifth position P5 via the fourth position P4 as illustrated in FIG. 16, the controller 110 may determine that the body U of the driver is located at the third position P3 in response to reception of the first reflection signal or that the body U of the driver is located at the fifth position P5 in response to reception of the second reflection signal.

If the second reflection signal is received within a predetermined time period after receiving the first reflection signal, the controller 110 may determine that the body U of the driver is located at the fourth position P4 between the third position P3 and the fifth position P5.

Thus, the controller 110 may determine that the body U of the driver has moved from the third position P3 to the fifth position P5 via the fourth position P4.

In addition, after detecting the motion of the driver, the controller 110 may transmit information about the detected motion of the driver to the network for vehicles NT via the communication unit 130.

As described above, the motion detecting apparatus 100 may determine not only the position of the body U of the driver but also movement of the body U of the driver, i.e., motion of the driver, based on the reflection signals output from the motion detecting antenna 200.

Although the motion detecting antenna 200 radiating the radio waves having the first and second frequencies in the first and second directions from the first and second positions and the motion detecting apparatus 100 including the motion detecting antenna 200 have been described above, configurations of the motion detecting antenna 200 are not limited thereto.

Figure 18:
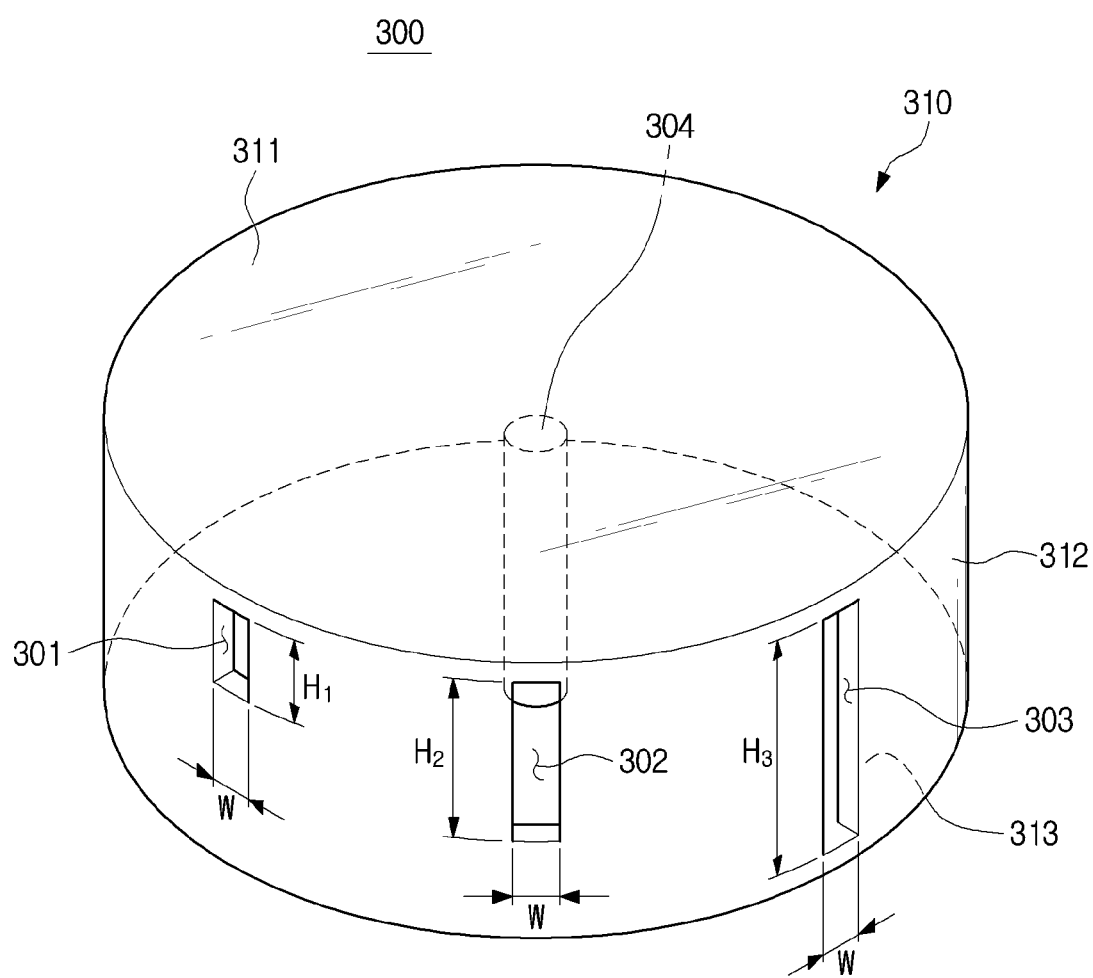
FIG. 18 is a view of a motion detecting antenna according to exemplary embodiments of the present disclosure.
Figure 19:
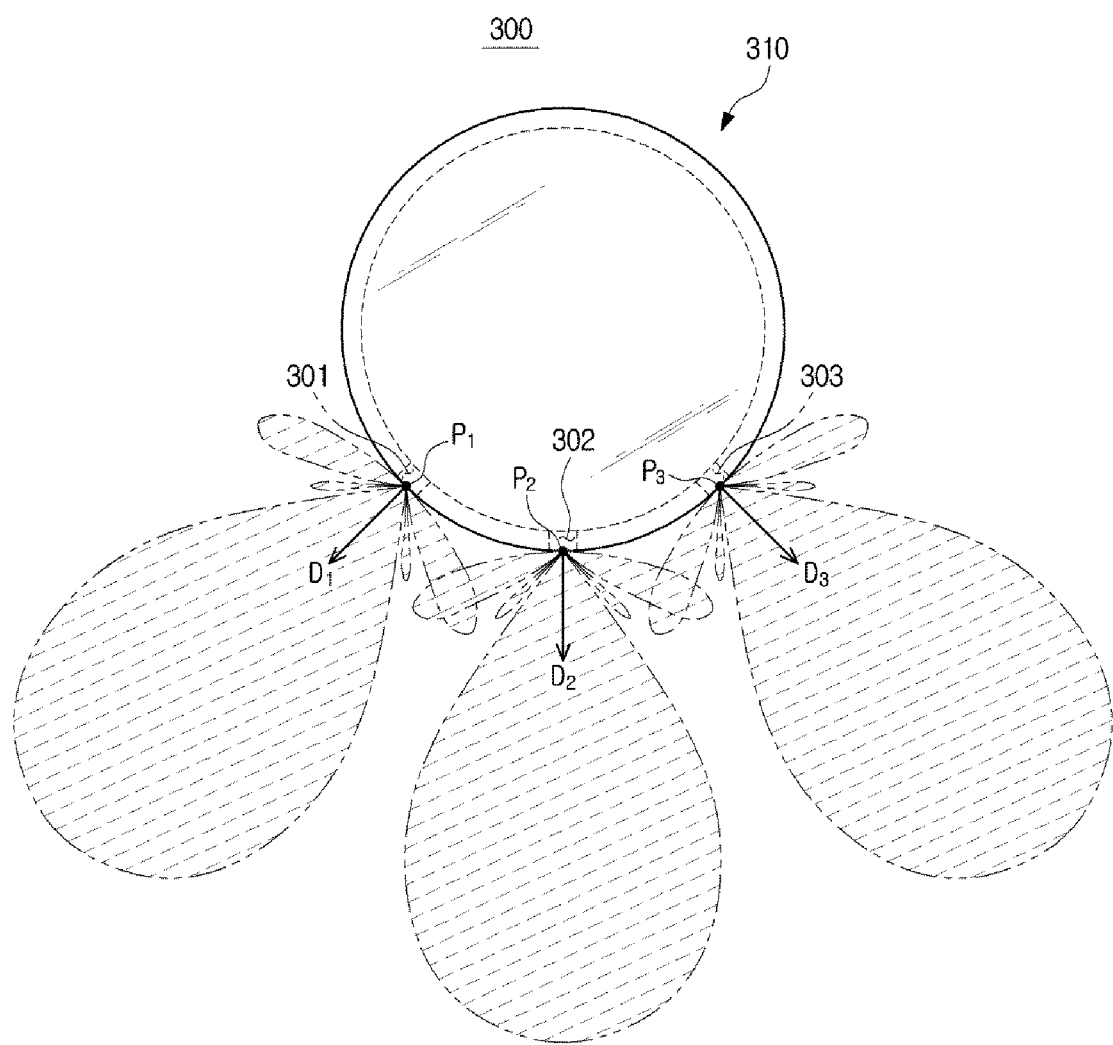
FIG. 19 is a view illustrating a radiation pattern of the motion detecting antenna of FIG. 18.
Figure 20:
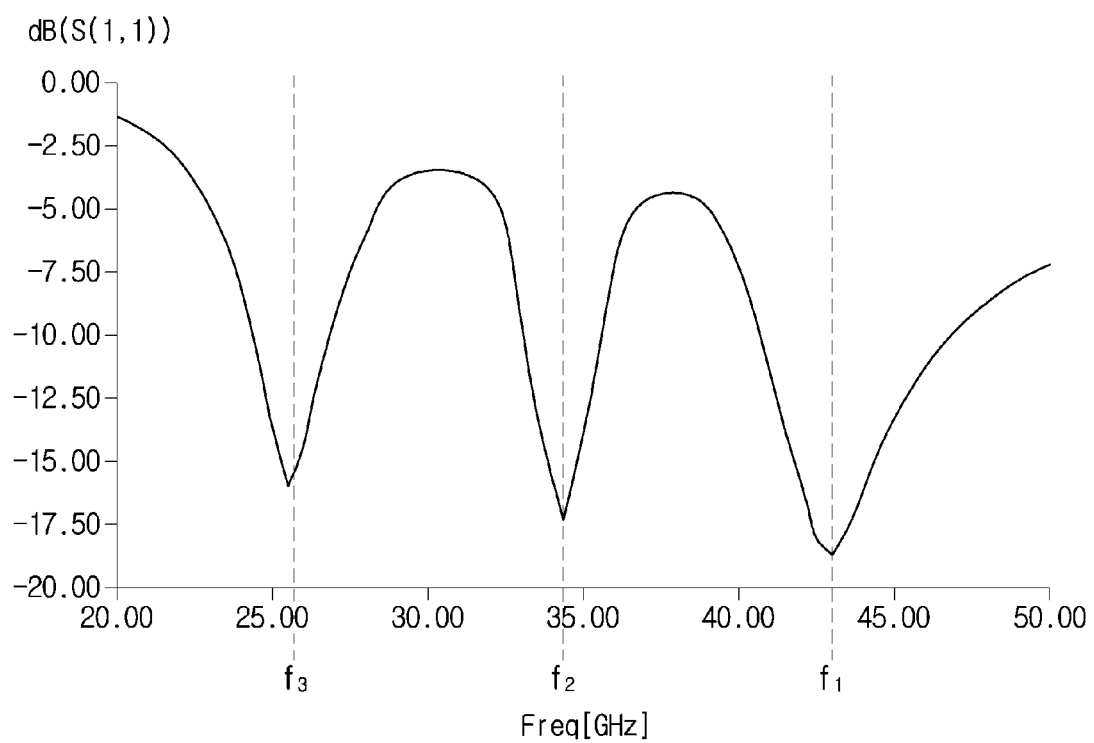
FIG. 20 is a graph illustrating frequency characteristics of the motion detecting antenna of FIG. 18.

FIG. 18 is a view of a motion detecting antenna according to exemplary embodiments of the present disclosure. FIG. 19 is a view illustrating a radiation pattern of the motion detecting antenna of FIG. 18. FIG. 20 is a graph illustrating frequency characteristics of the motion detecting antenna of FIG. 18.

As illustrated in FIG. 18, a motion detecting antenna 300 includes an antenna body 310 defining an appearance of the motion detecting antenna 300 and a plurality of slots 301, 302 and 303 formed along a side surface 313 of the antenna body 310. Also, a feed pin 304 radiating radio waves into the antenna body 310 is provided at one portion of the antenna body 310.

Since the antenna body 310 and the feed pin 304 are the same as the antenna body 210 and the feed pin 204 described above with reference to FIG. 5, descriptions thereof will not be repeated.

A plurality of slots, i.e., a first slot 301, a second slot 302 and a third slot 303, may be formed at the side surface 312 of the antenna body 310 along a circumferential direction of the antenna body 310.

The first slot 301, the second slot 302 and the third slot 303 may be formed through the side surface 312 of the antenna body 310. The free space outside the antenna body 310 may be connected to the inner space of the antenna body 310 through the first slot 301, the second slot 302, and the third slot 303. As a result, the electromagnetic field resonating in the antenna body 310 may be emitted into the free space through the first slot 301, the second slot 302 and the third slot 303. In other words, the radio waves may be radiated through the first slot 301, the second slot 302 and the third slot 303.

The first slot 301, the second slot 302 and the third slot 303 may be located at different positions along the circumferential direction of the antenna body 310. For example, the first slot 301 may be disposed at a first position P1, the second slot 302 may be disposed at a second position P2 spaced 45 degrees apart from the first position P1 along the circumferential direction of the antenna body 310 and the third slot 303 may be disposed at a third position P3 spaced 45 degrees apart from the second position P2.

Since the first slot 301, the second slot 302 and the third slot 303 are disposed at different positions along the circumferential direction of the antenna body 310, the radio waves may be radiated from different positions through the first slot 301, the second slot 302 and the third slot 303. For example, the radio waves may be radiated into the free space from the first position P1 through the first slot 301 and from the second position P2 through the second slot 302 as illustrated in FIG. 19. Also, the radio waves may be radiated into the free space from the third position P3 through the third slot 303.

Also, the first slot 301, the second slot 302 and the third slot 303 may be formed to face different directions along the circumferential direction of the antenna body 310. For example, as illustrated in FIG. 19, the first slot 301 may be formed to face a first direction D1, and the second slot 302 may be formed to face a second direction D2 spaced 45 degrees apart from the first direction D1. Also, the third slot 303 may be formed to face a third direction D3 spaced 45 degrees apart from the second direction D2.

Since the first slot 301, the second slot 302 and the third slot 303 are formed to face different directions along the circumferential direction of the antenna body 310, the radio waves may be radiated in different directions through the first slot 301, the second slot 302 and the third slot 303. For example, as illustrated in FIG. 19, the radio waves may be radiated in the first direction D1 through the first slot 301 and in the second direction D2 through the second slot 302 as illustrated in FIG. 19. Also, the radio waves may be radiated in the third direction D3 through the third slot 303.

The first slot 301, the second slot 302 and the third slot 303 may have different sizes. For example, the first slot 301, the second slot 302 and the third slot 303 may have the same width W, but a height H1 of the first slot 301, a height H2 of the second slot 302 and a height H3 of the third slot 303 may be different from each other.

Since the first slot 301, the second slot 302 and the third slot 303 have different sizes, frequencies of the radio waves radiated through the first slot 301, the second slot 302 and the third slot 303 may be different. For example, the radio wave radiated through the first slot 301 may have a first frequency f1, and the radio wave radiated through the second slot 302 may have a second frequency f2. Also, the radio wave radiated through the third slot 303 may have a third frequency f3.

Referring to FIG. 20 illustrating a S11-parameter of the motion detecting antenna 300, the S11-parameter has minimum values at the first frequency f1 (about 42 GHz), the second frequency f2 (about 34 GHz) and the third frequency f3 (about 26 GHz). Since the S11-parameter indicates the intensity of a signal reflected by an antenna with respect to the intensity of a signal input to the antenna, a smaller S11-parameter indicates that signals are radiated into the free space through the antenna. Thus, the minimum values observed at the first frequency f1 (about 42 GHz), the second frequency f2 (about 34 GHz) and the third frequency f3 (about 26 GHz) indicate that the motion detecting antenna 300 radiates radio waves having the first frequency f1 (about 42 GHz), the second frequency f2 (about 34 GHz), and the third frequency f3 (about 26 GHz) into the free space.

As described above, the motion detecting antenna 300 includes the antenna body 310 having the first slot 301, the second slot 302 and the third slot 303 through which the radio waves are radiated, and the first slot 301, the second slot 302 and the third slot 303 have different sizes H1, H2 and H2, and may be formed at different positions P1, P2 and P3 to face different directions D1, D2 and D3.

As a result, the radio waves having the different frequencies f1, f2 and f3 may be radiated through the first slot 301, the second slot 302 and the third slot 303 from the different positions P1, P2 and P3 in the different directions D1, D2 and D3. Based thereon, the motion detecting apparatus 100 including the motion detecting antenna 300 may determine the position of the body U of the driver.

As is apparent from the above description, a motion detecting apparatus configured to detect a motion of a driver and recognize a control command corresponding to the detected motion is provided according to exemplary embodiments.

According to some embodiments, a motion detecting antenna configured to radiate radio waves having different frequencies in different directions is provided.

According to some embodiments, a motion detecting antenna configured to radiate radio waves having different frequencies from different positions is provided.

Although some embodiments of the present disclosure have been shown and described, it would be appreciated by those skilled in the art that changes may be made in these embodiments without departing from the principles and spirit of the disclosure, the scope of which is defined in the claims and their equivalents.

Exemplary embodiments of the present disclosure have been described above. In the exemplary embodiments described above, some components may be implemented as a "module". Here, the term 'module' means, but is not limited to, a software and/or hardware component, such as a Field Programmable Gate Array (FPGA) or Application Specific Integrated Circuit (ASIC), which performs certain tasks. A module may advantageously be configured to reside on the addressable storage medium and configured to execute on one or more processors.

Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The operations provided for in the components and modules may be combined into fewer components and modules or further separated into additional components and modules. In addition, the components and modules may be implemented such that they execute one or more CPUs in a device.

With that being said, and in addition to the above described exemplary embodiments, embodiments can thus be implemented through computer readable code/instructions in/on a medium, e.g., a computer readable medium, to control at least one processing element to implement any above described exemplary embodiment. The medium can correspond to any medium/media permitting the storing and/or transmission of the computer readable code.

The computer-readable code can be recorded on a medium or transmitted through the Internet. The medium may include Read Only Memory (ROM), Random Access Memory (RAM), Compact Disk-Read Only Memories (CD-ROMs), magnetic tapes, floppy disks, and optical recording medium. Also, the medium may be a non-transitory computer-readable medium. The media may also be a distributed network, so that the computer readable code is stored or transferred and executed in a distributed fashion. Still further, as only an example, the processing element could include at least one processor or at least one computer processor, and processing elements may be distributed and/or included in a single device.

While exemplary embodiments have been described with respect to a limited number of embodiments, those skilled in the art, having the benefit of this disclosure, will appreciate that other embodiments can be devised which do not depart from the scope as disclosed herein. Accordingly, the scope should be limited only by the attached claims.

What is claimed is:

1. A motion detecting apparatus comprising:
   a motion detecting antenna configured to radiate a first radio wave having a first frequency from a first position through a first slot and a second radio wave having a second frequency from a second position through a second slot, wherein the second frequency is different from the first frequency and the second position is different from the first position;
   a motion detector configured to provide a first detection signal having the first frequency and a second detection signal having the second frequency to the motion detecting antenna and to receive a first reflection signal in response to the first radio wave and a second reflection signal in response to the second radio wave from the motion detecting antenna; and
   a controller configured to determine a motion of a driver based on the reflection signals received by the motion detector,
   wherein the controller determines that a body of the driver passes between the first slot and the second slot when the second reflection signal is received within a predetermined time period after receiving the first reflection signal.

2. The motion detecting apparatus according to claim 1, wherein the motion detecting antenna outputs the first reflection signal to the motion detector when the body of the driver is located at the first position and outputs the second reflection signal to the motion detector when the body of the driver is located at the second position.

3. The motion detecting apparatus according to claim 2, wherein the controller determines that the body of the driver is located at the first position upon receiving the first reflection signal from the motion detecting antenna and determines that the body of the driver is located at the second position upon receiving the second reflection signal from the motion detecting antenna.

4. The motion detecting apparatus according to claim 1, wherein the motion detecting antenna radiates the first and second radio waves having different frequencies in a plurality of different directions.

5. The motion detecting apparatus according to claim 1, wherein the motion detecting antenna radiates the first radio wave having the first frequency in a first direction and the second radio wave having the second frequency in a second direction.

6. The motion detecting apparatus according to claim 5, wherein the motion detecting antenna outputs the first reflection signal to the motion detector when the body of the driver is located in the first direction and outputs the second reflection signal to the motion detector when the body of the driver is located in the second direction.

7. The motion detecting apparatus according to claim 6, wherein the controller determines that the body of the driver is located in the first direction upon receiving the first reflection signal from the motion detecting antenna and determines that the body of the driver is located in the second direction upon receiving the second reflection signal from the motion detecting antenna.

8. A method of detecting a motion, the method comprising:
providing a first detection signal having a first frequency and a second detection signal having a second frequency to a motion detecting antenna;
radiating a first radio wave having the first frequency from a first position through a first slot and a second radio wave having the second frequency from a second position through a second slot via the motion detecting antenna, wherein the second frequency is different from the first frequency and the second position is different from the first position;
receiving a first reflection signal in response to the first radio wave and a second reflection signal in response to the second radio wave from the motion detecting antenna; and
determining a motion of a driver based on the first and second reflection signals,
wherein the determining includes:
determining that the second reflection signal is received within a predetermined time period after receiving the first reflection signal and in response, and
determining that a body of the driver passes between the first slot and the second slot.

9. The method according to claim 8, wherein when a body of the driver is located at least one of the first position or the second position, a reflection signal having the same frequency as the frequency of the radio wave radiated from each of the first position and the second position is received.

10. The method according to claim 8, wherein the step of radiating the first and second radio waves having different frequencies via the motion detecting antenna comprises radiating the first and second radio waves in different directions.

11. The method according to claim 10, wherein when the body of the driver is located in one or more directions among the plurality of different directions, a reflection signal having the same frequency as a frequency of the radio wave radiated in the one or more directions is received.

* * * * *